US008788339B2

(12) United States Patent
Hughes et al.

(10) Patent No.: US 8,788,339 B2
(45) Date of Patent: Jul. 22, 2014

(54) MULTIPLE ATTRIBUTION MODELS WITH RETURN ON AD SPEND

(75) Inventors: Gabriel Hughes, Falmouth (GB); Damien Allison, Surbiton (GB)

(73) Assignee: Google Inc., Mountain View, CA (US)

( * ) Notice: Subject to any disclaimer, the term of this patent is extended or adjusted under 35 U.S.C. 154(b) by 494 days.

(21) Appl. No.: 13/117,826

(22) Filed: May 27, 2011

(65) Prior Publication Data

US 2012/0303447 A1  Nov. 29, 2012

(51) Int. Cl.
*G06Q 30/00* (2012.01)
*G06Q 30/02* (2012.01)

(52) U.S. Cl.
CPC .................................. *G06Q 30/0255* (2013.01)
USPC ...................................................... 705/14.46

(58) Field of Classification Search
CPC ... G06Q 30/0601; G06Q 30/02; G06Q 30/08; G06Q 30/0207; G06Q 30/0253; G06Q 30/0267; G06Q 30/0611; G06Q 30/0251; G06Q 30/0277; G06Q 30/0214; G06Q 30/0224; G06Q 30/0236; G06Q 30/0239; G06Q 30/0255; G06Q 30/0631; G06Q 30/0222; G06Q 30/0275; G06Q 30/0242; G06Q 30/0261; G06Q 30/0269; G06Q 30/0271; G06Q 30/0201; G06Q 30/0273; G06Q 30/0627; G06Q 30/0643
USPC .......... 705/14, 7, 10, 14.6, 14.7, 14.1, 14.14, 705/14.5, 14.49, 14.64, 14.25, 14.36, 14.39, 705/14.51, 14.67, 14.16, 14.23, 14.41, 705/14.45, 14.46, 14.48, 14.53, 14.56, 705/14.66, 14.69, 14.71, 14.73, 14.4, 14.58, 705/26.63; 707/100, 104; 709/328
See application file for complete search history.

(56) References Cited

U.S. PATENT DOCUMENTS 3,020,129 A * 2/1962 Herrick ......................... 423/349
6,662,164 B1 * 12/2003 Koppelman et al. ........ 705/14.13
7,904,327 B2 * 3/2011 Phelan et al. ................. 705/7.29

(Continued)

FOREIGN PATENT DOCUMENTS

KR  10-2009-0092498  9/2009
KR  10-2009-0103961  10/2009

OTHER PUBLICATIONS

Fuor Digital, Multi-Touch Conversion Tracking: Path to Conversion and Conversion Attribution, Apr. 2009.*
Fuor Digital, Research Brief: Conversion Attribution, Feb. 2009.*

(Continued)

*Primary Examiner* — Arthur Duran
*Assistant Examiner* — Ian C Clarke
(74) *Attorney, Agent, or Firm* — Foley and Lardner LLP; John D. Lanza

(57) ABSTRACT

A computer system for providing attribution based on advertisement conversion data comprising a processing circuit configured to receive user interaction data, to determine that a conversion event has occurred based on the user interaction data and conversion criteria, to store conversion path data based on the user interaction data, wherein the conversion path data comprises user interaction data prior to and including the conversion event. The system attributes the conversion event to a channel in a conversion path using a plurality of different attribution models. At least one of the attribution models is a model other than a model based solely on a last click in the conversion path. The system receives cost data representing a relative or actual cost of a plurality of channels in the conversion path and generates report data comprising the first attribution data, the second attribution data and the cost data.

20 Claims, 14 Drawing Sheets

(56) References Cited

U.S. PATENT DOCUMENTS

| | | |
|---|---|---|
| 7,979,308 B2* | 7/2011 | Ho et al. ............... 705/14.7 |
| 2003/0171988 A1* | 9/2003 | Sugihara ............... 705/14 |
| 2005/0071218 A1* | 3/2005 | Lin et al. ............... 705/10 |
| 2010/0198680 A1* | 8/2010 | Ma et al. ............... 705/14.45 |
| 2011/0071900 A1* | 3/2011 | Kamath et al. ............... 705/14.46 |
| 2011/0125590 A1* | 5/2011 | Paroz et al. ............... 705/14.71 |
| 2011/0246267 A1* | 10/2011 | Williams et al. ............... 705/14.4 |
| 2012/0191528 A1* | 7/2012 | Bax et al. ............... 705/14.41 |
| 2012/0303447 A1* | 11/2012 | Hughes et al. ............... 705/14.46 |
| 2013/0132201 A1* | 5/2013 | Mysen et al. ............... 705/14.54 |
| 2013/0231977 A1* | 9/2013 | Synett et al. ............... 705/7.35 |

OTHER PUBLICATIONS

Malm, Kaylan, iCrossing Capabilities Report: Cross-Channel Attribution Modeling in Action, Aug. 2009.*

Chandler-Pepelnjak, John, Modeling Conversions in Online Advertising, May 2010.*

International Search Report and Written Opinion for PCT/US2011/053946, date of mailing Apr. 30, 2012, 9 pages.

Lovett, A Framework for Multicampaign Attribution Measurement, forrester Research Inc, Feb. 19, 2009, 14 pages.

\* cited by examiner

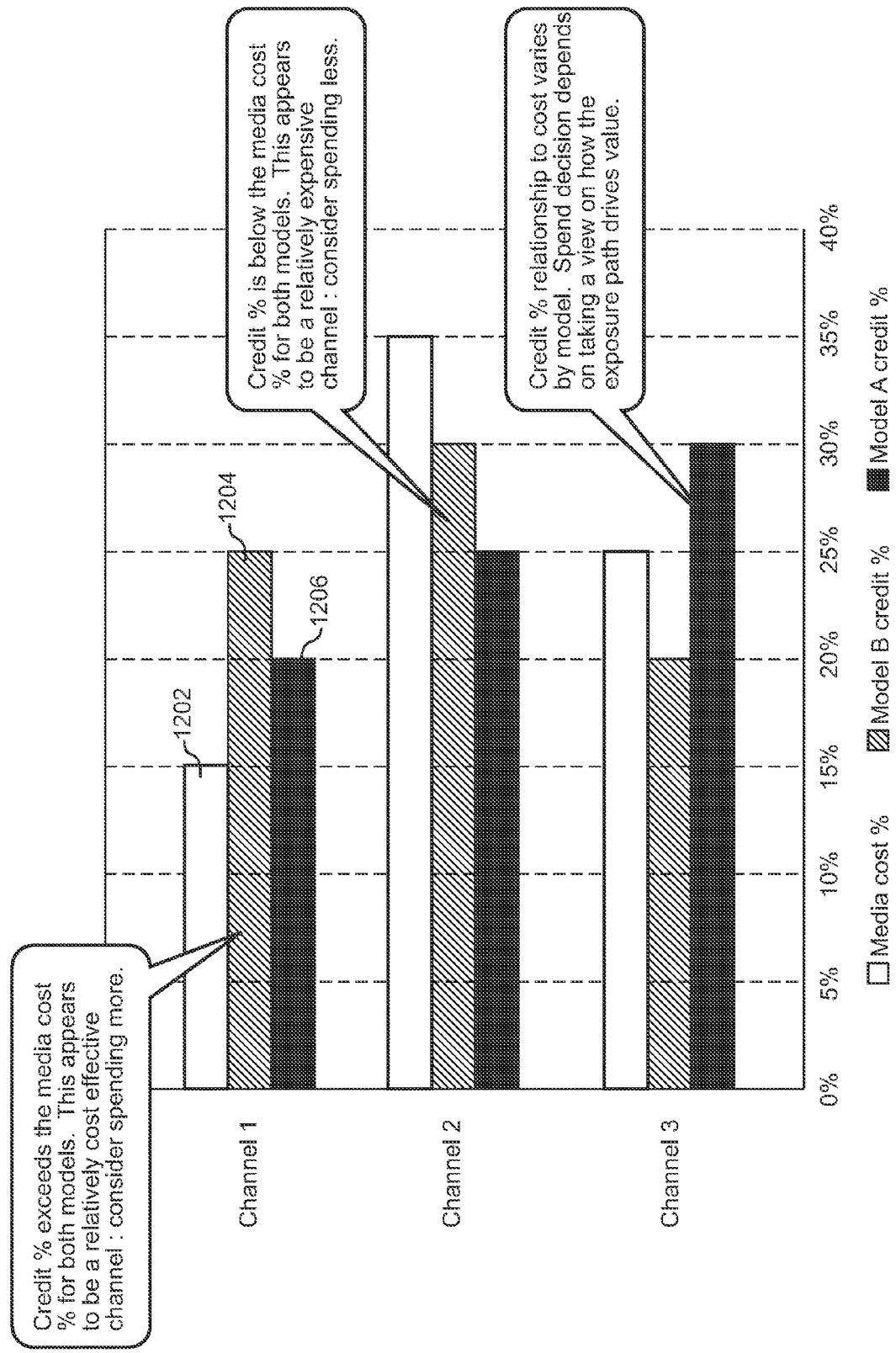

| Media channel | Model A credit % | Model B credit % | Media cost % | ROI ratio A credit/cost | ROI ratio B credit/cost | Decision |
|---|---|---|---|---|---|---|
| Channel 1 | 20% | 25% | 15% | 1.33 | 1.67 | Consider higher spend |
| Channel 2 | 25% | 30% | 35% | 0.71 | 0.86 | Consider reduced spend |
| Channel 3 | 30% | 20% | 25% | 1.20 | 0.80 | Spend decision depends on taking a view on how the exposure path drives value |

FIG. 12B

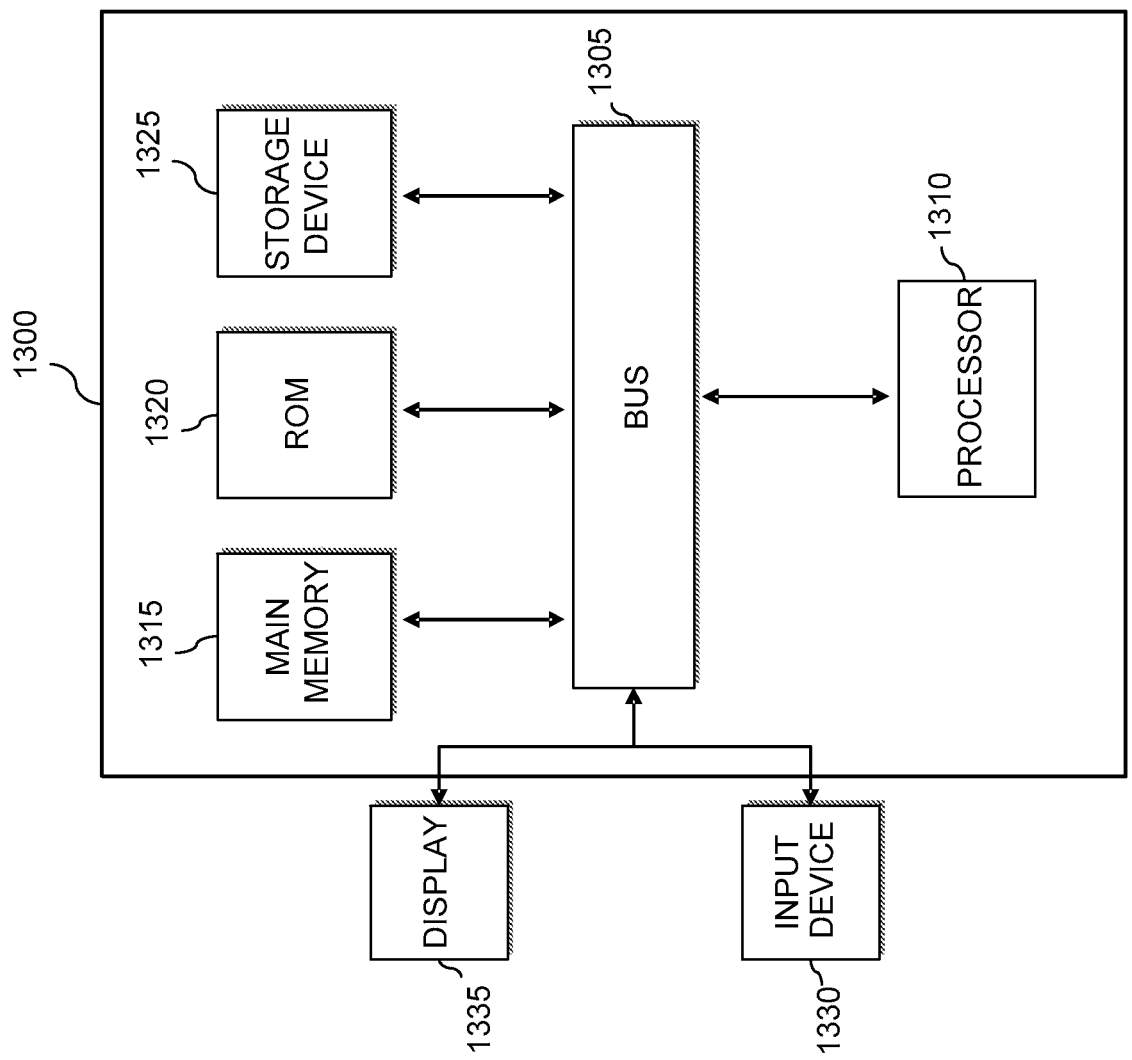

US 8,788,339 B2

MULTIPLE ATTRIBUTION MODELS WITH RETURN ON AD SPEND

BACKGROUND

The internet provides access to a wide variety of content. For instance, images, audio, video, and web pages for a myriad of different topics are accessible through the Internet. The accessible content provides an opportunity to place advertisements. Advertisements can be placed within content, such as a web page, image or video, or the content can trigger the display of one or more advertisements, such as presenting an advertisement in an advertisement slot.

Advertisers decide which ads are displayed within particular content using various advertising management tools. These tools also allow an advertiser to track the performance of various ads or ad campaigns. The parameters used to determine when to display a particular ad can also be changed using advertising management tools. A user often is exposed to or interacts with more than one marketing channel prior to a conversion event.

Attribution modeling is the practice of attributing credit to marketing channels that led to a web site and subsequently resulted in a conversion event. An attribution model includes the algorithm which determines how conversion credit is shared between multiple marketing channels.

SUMMARY

A computer system for providing attribution based on advertisement conversion data comprising a processing circuit configured to receive user interaction data, to determine that a conversion event has occurred based on the user interaction data and conversion criteria, to store conversion path data based on the user interaction data, wherein the conversion path data comprises user interaction data prior to and including the conversion event. The system attributes the conversion event to a channel in a conversion path using a plurality of different attribution models. At least one of the attribution models is a model other than a model based solely on a last click in the conversion path. The system receives cost data representing a relative or actual cost of a plurality of channels in the conversion path and generates report data comprising the first attribution data, the second attribution data and the cost data.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

FIG. 12A is an illustration of exemplary display data or report data showing results of multiple attribution model calculations comprising cost data, according to an exemplary embodiment.

FIG. 12B is an illustration of exemplary display data or report data showing results of multiple attribution model calculations comprising cost data, according to another exemplary embodiment.

FIG. 13 is a block diagram of an exemplary computer system for use with the disclosed embodiments.

DETAILED DESCRIPTION

Figure 1:
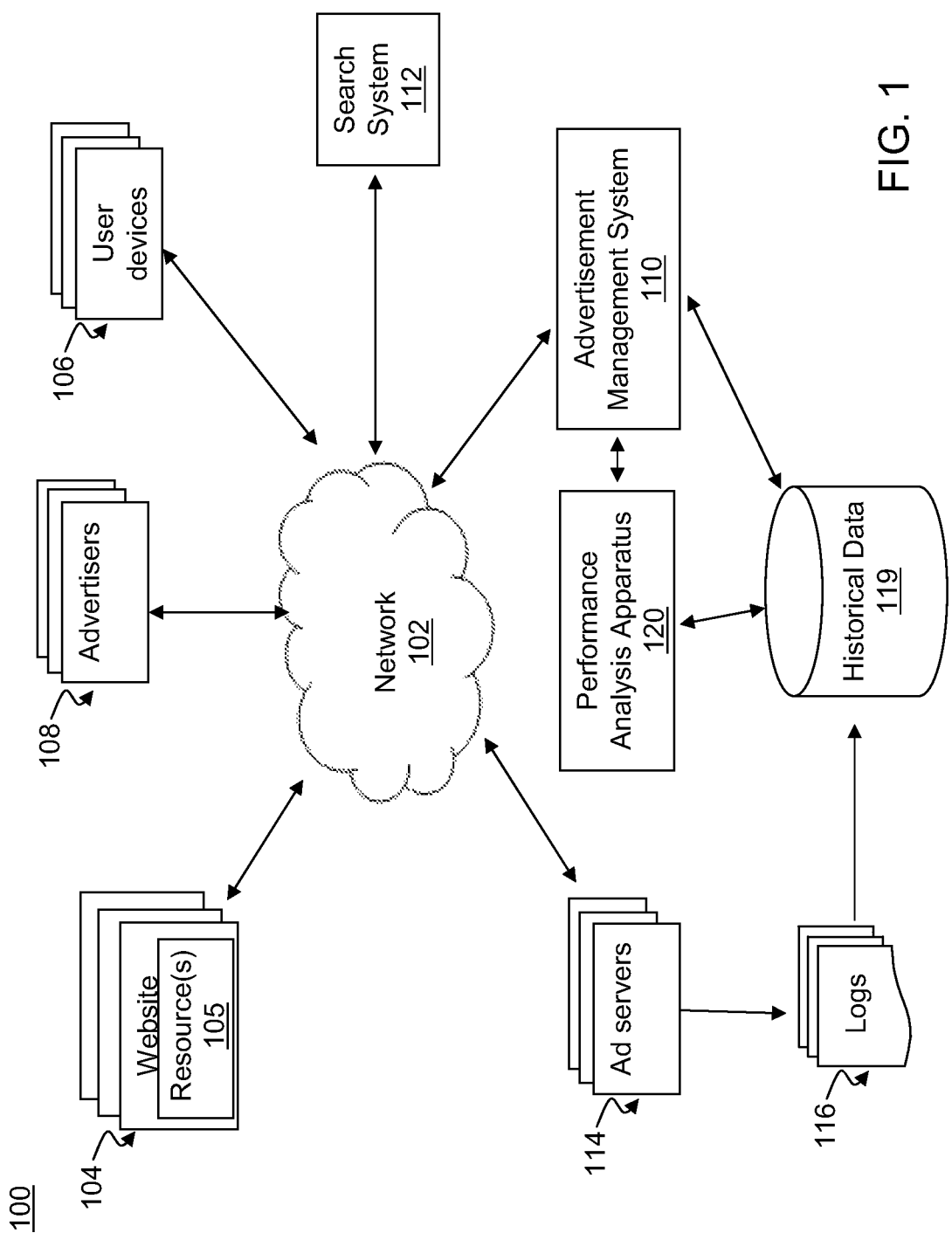
FIG. 1 is a block diagram of an example environment in which an advertisement management system manages advertising services in accordance with an illustrative embodiment.

In one or more embodiments, a plurality of different attribution models or algorithms may be applied to conversion path data. Each model may provide differing credit to the different channels in the conversion path. In one or more embodiments, cost data for each channel may be processed with the differing credit values to provide information about the relative values of using each channel in a marketing campaign. Advertisers or other content providers may then use this value information to improve their marketing campaigns by, e.g., allocating more or less money to the different channels in a future campaign.

Content providers (e.g., advertisers) are provided various reports that disclose various user interactions with content. Each user interaction can include a number of dimensions, which can contain data associated with the user interaction. Reports can be generated to provide an advertiser with information regarding the user interactions. User interactions can include user interactions from various channels. Channels are a way to describe the originating source of a user interaction. Illustrative examples of user interactions and channels include clicking on a paid advertisement, directly navigating to a website, clicking on an organic search result, clicking on a link within an email, clicking on a link from a referring website, clicking on a link from a social networking website, mousing over an advertisement, providing a display on a web page of a banner advertisement or other advertisement to give the user an opportunity to see the advertisement in a case where the user does not click on it or otherwise positively interact with it, etc. Conversion paths include one or more user interactions that preceded a conversion user interaction.

User interactions include any presentation of content to a user and any subsequent affirmative actions or non-actions (collectively referred to as "actions" unless otherwise specified) that a user takes in response to presentation of content to the user (e.g., selections of the content following presentation of the content, or no selections of the content following the presentation of the content). Thus, a user interaction does not necessarily require a selection of the content (or any other affirmative action) by the user. A user interaction may be merely an exposure or impression that a user views or does not actually view. User interaction data may comprise user exposures, for example to include data regarding a user who is tracked as being exposed to an ad impression but does not click or proactively interact with it.

User interaction measures can include one or more of time lag measures (i.e., measures of time from one or more specified user interactions to a conversion), path length measures (i.e., quantities of user interactions that occurred prior to conversions), user interaction paths (i.e., sequences of user interactions that occurred prior to the conversion), assist interaction measures (i.e., quantities of particular user interactions that occurred prior to the conversion), and assisted conversion measures (i.e., quantities of conversions that were assisted by specified content). User interactions data may be collected from serving and tracking activity across the Internet and across many networks. Tracking tags may be used. A user may opt out of this tracking activity in a number of ways. Data may be collected for a plurality of different attribution models.

FIG. 1 is a block diagram of an example environment in which an advertisement management system manages advertising services, in accordance with an illustrative embodiment. The example environment 100 includes a network 102, such as a local area network (LAN), a wide area network (WAN), the Internet, or a combination thereof. The network 102 connects websites 104, user devices 106, advertisers 108, and an advertisement management system 110. The example environment 100 may include many thousands or more of websites 104, user devices 106 and advertisers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts.

When a user is exposed to or interacts with a marketing channel, the channel has a number of attributes that may be of interest to marketing analysis, such as the site, the type of ad, the ad campaign which the ad forms a part of, the site placement (which page on a site), the particular ad message, the particular ad image or text, and the ad size. When analyzing the value of advertising using attribution models, the differences in these attributes can be compared through crediting all like attributes using an attribution model. Thus, a given attribution model may be used to compare the attributed credit for all sites included in the analysis; but may also be used to compare all campaigns, or to compare all ad placements, and so on, depending on the attribute which is being analyzed.

A resource 105 is any data that can be provided over the network 102. A resource 105 may be identified by a resource address that is associated with the resource 105, such as a uniform resource locator (URL). Resources 105 can include web pages, word processing documents, portable document format (PDF) documents, images, video, programming elements, interactive content, and feed sources, to name only a few. The resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages such as JavaScript® or ECMAScript®.

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can include data specifying a portion of the resource or a portion of a user display (e.g., a presentation location of a pop-up window or in a slot of a web page) in which advertisements can be presented. These specified portions of the resource 105 or user display are referred to as advertisement slots.

To facilitate searching of the vast number of resources 105 accessible over the network 102, the environment 100 can include a search system 112 that identifies the resources 105 by crawling and indexing the resources 105 provided on the websites 104. Data about the resources 105 can be indexed based on the resource 105 with which the data is associated. The indexed and, optionally, cached copies of the resources 105 are stored in a search index (not shown).

User devices 106 can submit search queries to the search system 112 over the network 102. In response, the search system 112 accesses the search index to identify resources 105 that are relevant to the search query. In one illustrative embodiment, a search query includes one or more keywords. The search system 112 identifies the resources 105 that are responsive to the query, provides information about the resources 105 in the form of search results and returns the search results to the user devices 106 in search results pages. A search result can include data generated by the search system 112 that identifies a resource 105 that is responsive to a particular search query, and can include a link to the resource 105. An example search result can include a web page title, a snippet of text or a portion of an image extracted from the web page 104, a rendering of the resource 105, and the URL of the web page 104. Search results pages can also include one or more advertisement slots in which advertisements can be presented.

A search result page can be sent with a request from the search system 112 for the web browser of the user device 106 to set an HTTP (HyperText Transfer Protocol) cookie. A cookie can represent, for example, a particular user device 106 and a particular web browser. For example, the search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifier can be anonymized and is not connected with user names. Because HTTP is a stateless protocol, the use of cookies allows an external service, such as the search system 112 or other system, to track particular actions and status of a user over multiple sessions. A user may opt out of tracking user actions, for example, by disabling cookies in the browser's settings.

When a resource 105 or search results are requested by a user device 106 or provided to the user device 106, the advertisement management system 110 receives a request for advertisements to be provided with the resource 105 or search results. The request for advertisements can include characteristics of the advertisement slots that are defined for the requested resource 105 or search results page, and can be provided to the advertisement management system 110. For example, a reference (e.g., URL) to the resource 105 for which the advertisement slot is defined, a size of the advertisement slot, and/or media types that are available for presentation in the advertisement slot can be provided to the advertisement management system 110. Similarly, keywords (i.e., one or more words that are associated with content) associated with a requested resource 105 ("resource keywords") or a search query for which search results are requested can also be provided to the advertisement management system 110 to facilitate identification of advertisements that are relevant to the resource 105 or search query.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries. In some implementations, advertisements having targeting keywords that match the resource keywords, the search query, or portions of the search query are selected as eligible advertisements by the advertisement management system 110.

The advertisement management system 110 selects an eligible advertisement for each advertisement slot of a resource 105 or of a search results page. The resource 105 or search results page is received by the user device 106 for presentation by the user device 106. User interaction data representing user interactions with presented advertisements can be stored in a historical data store 119. For example, when an advertisement is presented to the user via an ad server 114, data can be stored in a log file 116. This log file 116, as more fully described below, can be aggregated with other data in the historical data store 119. Accordingly, the historical data store 119 contains data representing the advertisement impression. For example, the presentation of an advertisement is stored in response to a request for the advertisement that is presented. For example, the ad request can include data identifying a particular cookie, such that data identifying the cookie can be stored in association with data that identifies the advertisement(s) that were presented in response to the request. In some implementations, the data can be stored directly to the historical data store 119.

Similarly, when a user selects (i.e., clicks) a presented advertisement, data representing the selection of the advertisement can be stored in the log file 116, a cookie, or the historical data store 119. In some implementations, the data is stored in response to a request for a web page that is linked to by the advertisement. For example, the user selection of the advertisement can initiate a request for presentation of a web page that is provided by (or for) the advertiser. The request can include data identifying the particular cookie for the user device, and this data can be stored in the advertisement data store.

User interaction data can be associated with unique identifiers that represent a corresponding user device with which the user interactions were performed. For example, in some implementations, user interaction data can be associated with one or more cookies. Each cookie can include content which specifies an initialization time that indicates a time at which the cookie was initially set on the particular user device 106.

The log files 116, or the historical data store 119, also store references to advertisements and data representing conditions under which each advertisement was selected for presentation to a user. For example, the historical data store 119 can store targeting keywords, bids, and other criteria with which eligible advertisements are selected for presentation. Additionally, the historical data store 119 can include data that specifies a number of impressions for each advertisement and the number of impressions for each advertisement can be tracked, for example, using the keywords that caused the advertisement impressions and/or the cookies that are associated with the impressions. Data for each impression can also be stored so that each impression and user selection can be associated with (i.e., stored with references to and/or indexed according to) the advertisement that was selected and/or the targeting keyword that caused the advertisement to be selected for presentation.

The advertisers 108 can submit, to the advertisement management system 110, campaign parameters (e.g., targeting keywords and corresponding bids) that are used to control distribution of advertisements. The advertisers 108 can access the advertisement management system 110 to monitor performance of the advertisements that are distributed using the campaign parameters. For example, an advertiser can access a campaign performance report that provides a number of impressions (i.e., presentations), selections (i.e., clicks), and conversions that have been identified for the advertisements. The campaign performance report can also provide a total cost, a cost-per-click, and other cost measures for the advertisement over a specified period of time. For example, an advertiser may access a performance report that specifies that advertisements distributed using the phrase match keyword "hockey" have received 1,000 impressions (i.e., have been presented 1,000 times), have been selected (e.g., clicked) 20 times, and have been credited with 5 conversions. Thus, the phrase match keyword hockey can be attributed with 1,000 impressions, 20 clicks, and 5 conversions.

As described above, reports that are provided to a particular content provider can specify performance measures measuring user interactions with content that occur prior to a conversion. A conversion occurs when a user performs a specified action, and a conversion path includes a conversion and a set of user interactions occurring prior to the conversion by the user. What constitutes a conversion may vary from case to case and can be determined in a variety of ways. For example, a conversion may occur when a user clicks on an advertisement, is referred to a web page or website, and then consummates a purchase there before leaving the web page or website. As another example, a conversion may occur when a user spends more than a given amount of time on a particular website. Data from multiple user interactions can be used to determine the amount of time at the particular website.

Actions that constitute a conversion can be specified by each advertiser. For example, each advertiser can select, as a conversion, one or more measurable/observable user actions such as, for example, downloading a white paper, navigating to at least a given depth of a website, viewing at least a certain number of web pages, spending at least a predetermined amount of time on a website or web page, purchasing a product, or registering on a website. Other actions that constitute a conversion can also be used.

To track conversions (and other interactions with an advertiser's website), an advertiser can include, in the advertiser's web pages, embedded instructions that monitor user interactions (e.g., page selections, content item selections, and other interactions) with advertiser's website, and can detect a user interaction (or series of user interactions) that constitutes a conversion. In some implementations, when a user accesses a web page, or another resource, from a referring web page (or other resource), the referring web page (or other resource) for that interaction can be identified, for example, by execution of a snippet of code that is referenced by the web page that is being accessed and/or based on a URL that is used to access the web page.

For example, a user can access an advertiser's website by selecting a link presented on a web page, for example, as part of a promotional offer by an affiliate of the advertiser. This link can be associated with a URL that includes data (i.e., text) that uniquely identifies the resource from which the user is navigating. For example, the link http://www.example.com/homepage/%affiliate_identifier % promotion_1 specifies that the user navigated to the example.com web page from a web page of the affiliate that is associated with the affiliate identifier number that is specified in the URL, and that the user was directed to the example.com web page based on a selection of the link that is included in the promotional offer that is associated with promotion_1. The user interaction data for this interaction (i.e., the selection of the link) can be stored in a database and used, as described below, to facilitate performance reporting.

When a conversion is detected for an advertiser, conversion data representing the conversion can be transmitted to a data processing apparatus ("analytics apparatus") that receives the conversion data, and in turn, stores the conversion data in a data store. This conversion data can be stored in association with one or more cookies for the user device that was used to perform the user interaction, such that user interaction data associated with the cookies can be associated with the conversion and used to generate a performance report for the conversion.

Typically, a conversion is attributed to a targeting keyword when an advertisement that is targeted using the targeted keyword is the last clicked advertisement prior to the conversion. For example, advertiser X may associate the keywords "tennis," "shoes," and "Brand-X" with advertisements. In this example, assume that a user submits a first search query for "tennis," the user is presented a search result page that includes advertiser X's advertisement, and the user selects the advertisement, but the user does not take an action that constitutes a conversion. Assume further that the user subsequently submits a second search query for "Brand-X," is presented with the advertiser X's advertisement, the user selects advertiser X's advertisement, and the user takes action that constitutes a conversion (e.g., the user purchases Brand-X tennis shoes). In this example, the keyword "Brand-X" will be credited with the conversion because the last advertisement selected prior to the conversion ("last selected advertisement") was an advertisement that was presented in response to the "Brand-X" being matched.

Providing conversion credit to the keyword that caused presentation of the last selected advertisement ("last selection credit") prior to a conversion is a useful measure of advertisement performance, but this measure alone does not provide advertisers with data that facilitates analysis of a conversion cycle that includes user exposure to, and/or selection of, advertisements prior to the last selected advertisement. For example, last selection credit measures alone do not specify keywords that may have increased brand or product awareness through presentation of advertisements that were presented to, and/or selected by, users prior to selection of the last selected advertisement. However, these advertisements may have contributed significantly to the user subsequently taking action that constituted a conversion.

In the example above, the keyword "tennis" is not provided any credit for the conversion, even though the advertisement that was presented in response to a search query matching the keyword "tennis" may have contributed to the user taking an action that constituted a conversion (e.g., making a purchase of Brand-X tennis shoes). For instance, upon user selection of the advertisement that was presented in response to the keyword "tennis" being matched, the user may have viewed Brand-X tennis shoes that were available from advertiser X. Based on the user's exposure to the Brand-X tennis shoes, the user may have subsequently submitted the search query "Brand-X" to find the tennis shoes from Brand-X. Similarly, the user's exposure to the advertisement that was targeted using the keyword "tennis," irrespective of the user's selection of the advertisement, may have also contributed to the user subsequently taking action that constituted a conversion (e.g., purchasing a product from advertiser X). Analysis of user interactions, with an advertiser's advertisements (or other content), that occur prior to selection of the last selected advertisement can enhance an advertiser's ability to understand the advertiser's conversion cycle.

A conversion cycle is a period that begins when a user is presented an advertisement and ends at a time at which the user takes action that constitutes a conversion. A conversion cycle can be measured and/or constrained by time or actions and can span multiple user sessions. User sessions are sets of user interactions that are grouped together for analysis. Each user session includes data representing user interactions that were performed by a particular user and within a session window (i.e., a specified period). The session window can be, for example, a specified period of time (e.g., 1 hour, 1 day, or 1 month) or can be delineated using specified actions. For example, a user search session can include user search queries and subsequent actions that occur over a 1 hour period and/or occur prior to a session ending event (e.g., closing of a search browser).

Analysis of a conversion cycle can enhance an advertiser's ability to understand how its customers interact with advertisements over a conversion cycle. For example, if an advertiser determines that, on average, an amount of time from a user's first exposure to an advertisement to a conversion is 20 days, the advertiser can use this data to infer an amount of time that users spend researching alternative sources prior to converting (i.e., taking actions that constitute a conversion). Similarly, if an advertiser determines that many of the users that convert do so after presentation of advertisements that are targeted using a particular keyword, the advertiser may want to increase the amount of money that it spends on advertisements distributed using that keyword and/or increase the quality of advertisements that are targeted using that particular keyword.

Measures of user interactions that facilitate analysis of a conversion cycle are referred to as conversion path performance measures. Conversion path performance measures specify durations of conversion cycles, numbers of user interactions that occurred during conversion cycles, paths of user interactions that preceded a conversion, numbers of particular user interactions that occurred preceding conversions, as well as other measures of user interaction that occurred during conversion cycles, as described in more detail below.

The advertisement management system 110 includes a performance analysis apparatus 120 that determines conversion path performance measures that specify measures of user interactions with content items during conversion cycles. The performance analysis apparatus 120 tracks, for each advertiser, user interactions with advertisements that are provided by the advertiser, determines (i.e., computes) one or more conversion path performance measures, and provides data that cause presentation of a performance report specifying at least one of the conversion path performance measures. Using the performance report, the advertiser can analyze its conversion cycle, and learn how each of its keywords cause presentation of advertisements that facilitate conversions, irrespective of whether the keywords caused presentation of the last selected advertisement. In turn, the advertiser can adjust campaign parameters that control distribution of its advertisements based on the performance report.

Configuration options can be offered to reduce bias in performance reports. Without configuration options, some performance reports can be biased, such as towards short conversion paths. For example, a performance report can be biased towards short conversion paths if data used as a basis for the report includes a percentage of partial conversion paths which is higher than a threshold percentage. A partial conversion path is a conversion path in which some but not all user interaction data for a user is associated with a conversion. A partial conversion path can be included in a report if, for example, the report is generated using a reporting period which is less then the length of a typical conversion cycle for the advertiser who requested the report.

A reporting period determines the maximum length (in days) of a reported conversion cycle because additional data outside of the reporting period is not used to generate the report. A performance report can be based on a reporting period (i.e., lookback window), such that user interactions prior to the reporting period are not considered part of the conversion cycle when generating the report. Such a reporting period is referred to as a "lookback window". For example, when generating a report with a lookback window of thirty days, available user interaction data representing user actions that occurred between July 1 and July 31 of a given year would be available for a conversion that occurred on July 31 of that year.

If a default lookback window (e.g., thirty days) is used, the performance report can be biased towards short conversion paths if the typical conversion cycle length for a product associated with the report is greater than the default lookback window. For instance, in the example above, a typical conversion cycle for "Brand-X" tennis shoes may be relatively short (e.g., thirty days) as compared to a conversion cycle for a more expensive product, such as a new car. A new car may have a much longer conversion cycle (e.g., ninety days).

An attribution model may include an algorithm defining which of a plurality of lookback windows to use and/or modifying these lookback windows based on user ad exposure, interaction and conversion data. In one example, different attribution models may apply different lookback windows to determine conversion events. The use of lookback windows to select conversion events may be kept as broad as possible such that all conversion events in a given time period are selected for processing by the attribution model algorithms.

Different advertisers or different products for an advertiser can have different associated conversion cycle lengths. For example, an advertiser that sells low cost (e.g., less than $100) products may specify a lookback window of 30 days, while an advertiser that sells more expensive products (e.g., at least $1000) may specify a lookback window of 90 days.

In some implementations, an advertiser 108 can specify a lookback window to use when requesting a performance report, such as by entering a number of days or by selecting a lookback window from a list of specific lookback windows (e.g., thirty days, sixty days, ninety days). Allowing an advertiser to configure the lookback window of their performance reports enables the advertiser to choose a lookback window that corresponds to conversion cycles of their products. Allowing lookback window configuration also enables advertisers to experiment with different lookback windows, which can result in the discovery of ways to improve conversion rates.

Other factors can contribute to reporting on partial conversion paths. For example, as mentioned above, user interaction data used as a basis for a report can be associated with unique identifiers that represent a user device with which the user interactions were performed. As described above, a unique identifier can be stored as a cookie. Cookies can be deleted from user devices, such as by a user deleting cookies, a browser deleting cookies (e.g., upon browser exit, based on a browser preference setting), or some other software (e.g., anti-spyware software) deleting cookies.

If cookies are deleted from a user device, a new cookie will be set on the user's device when the user visits a web page (e.g., the search system 112). The new cookie may be used to store a new quasi-unique identifier, and thus subsequent user interaction data that occurs on the user device may be associated with a different identifier. Therefore, because each user identifier is considered to represent a different user, the user interaction data associated with the deleted cookies are identified as being associated with a different user than the user interaction data that is associated with the new cookies.

For instance, in the example above, assume that the user deletes cookies after the first search query for "tennis" is performed and that the second search query for "Brand-X" occurs after the cookies are deleted. In this example, performance measures computed based on the user interaction data for the user can show a bias. For example, a path length measure can be computed as one, rather than two, since the advertisement selection resulting from the first search query is not considered part of the same conversion cycle as the advertisement selection resulting from the second search query, since the two user interactions do not appear to have been performed by the same user.

To view a report which reduces bias caused from partial conversion paths, an advertiser can specify a lookback window for the report. As described above, the lookback window specifies that the user interaction data used to generate the report are user interaction data that are associated with unique identifiers that have initialization times that are prior to a specified period (e.g., thirty days, sixty days, ninety days) before the conversions. Thus, conversions for which user interaction data that are associated with unique identifiers having initialization times that are after the specified period are excluded from inclusion as a basis for the report. A unique identifier that has a recent initialization time indicates that the unique identifier may have been recently reinitialized on the user device that the unique identifier represents. Accordingly, user interaction data associated with the relatively new unique identifier may represent only a partial conversion path. Alternatively, conversions for which user interaction data that are associated with unique identifiers having initialization times that are after the specified period are included in the report. To reduce bias, any user interaction included in the conversion path that occurred after the specified period are removed from the conversion path prior to being included in the report.

Figure 2:
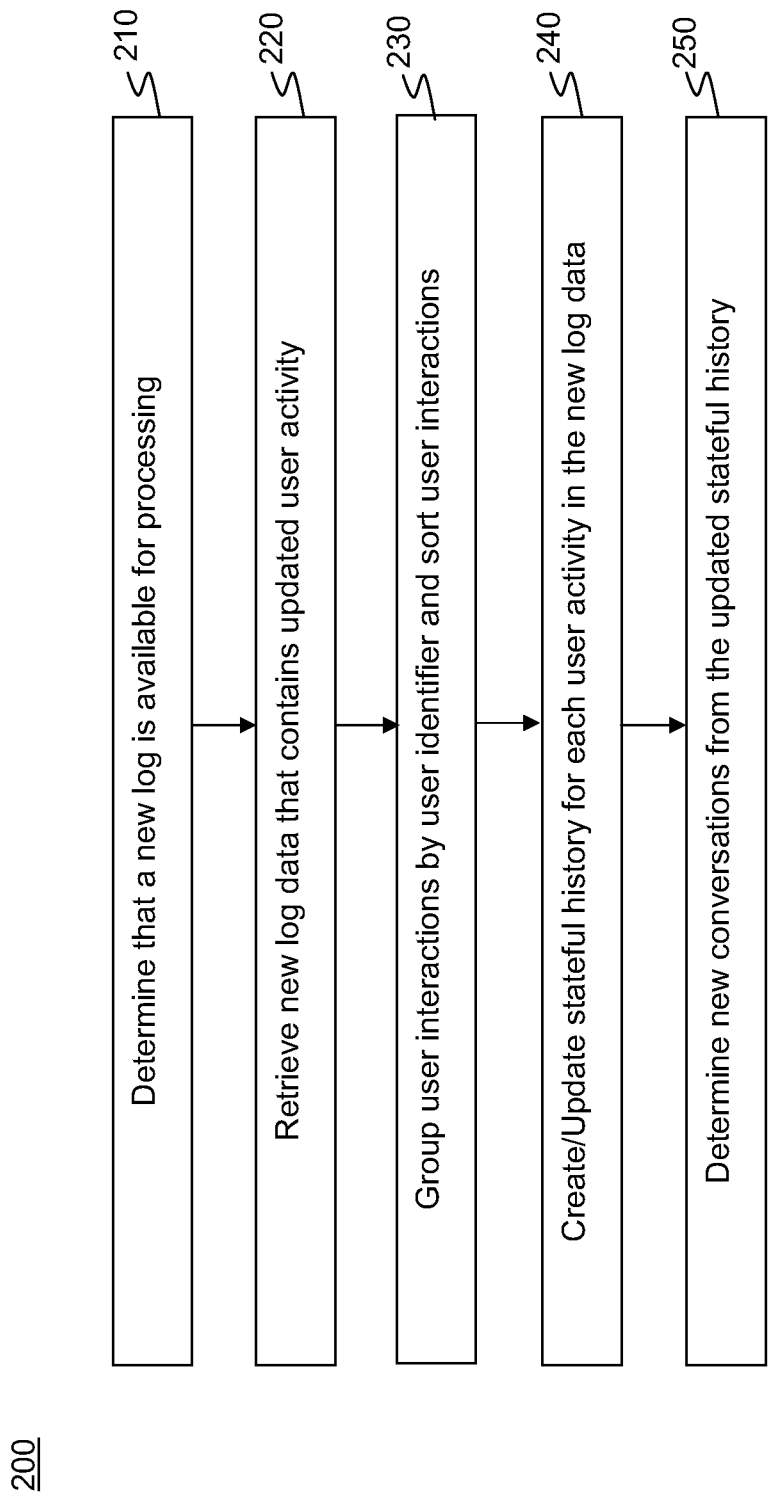
FIG. 2 is a flow diagram of a process for integrating user interaction log data in accordance with an illustrative embodiment.

FIG. 2 is a flow diagram of a process for integrating user interaction log data in accordance with an illustrative embodiment. The process 200 is a process that updates conversion paths and determines conversions based upon the updated conversion paths of users.

The process 200 can be implemented on the advertisement management system 110, the performance analysis apparatus 120, or another computing device. In one implementation, the process 200 is encoded on a computer-readable medium that contains instructions that when executed by a computing device cause the computing device to perform operations of process 200.

As described above, log files 116 may contain user interaction data. A log file 116 may be combined with user interaction data from other logs from other servers, including those that implement the search system 112, prior to processing. Processing starts with the computing device that implements the process 200 determining that a new log is available for processing (210). For example, a notification can be sent to the computing device indicating that a new log is ready for processing, or the existence of a new log can indicate that the new log is ready for processing.

Figure 3:
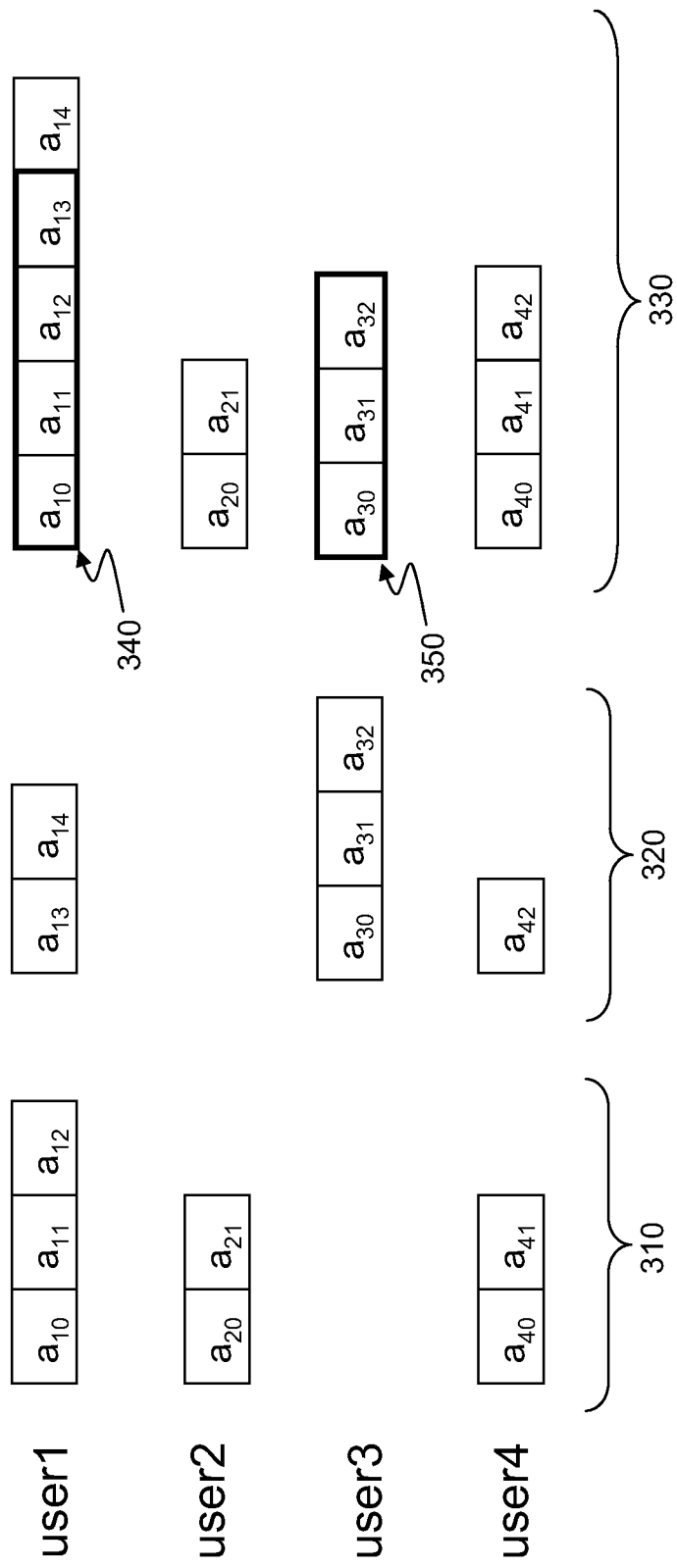
FIG. 3 is a block diagram that illustrates user interaction data being updated during a user interaction log data integration process in accordance with an illustrative embodiment.

Next, the new log is retrieved (220). The new log may be retrieved over the network 102. The stateful history for each user is updated based upon the user activity indicated by the new log. The new log can contain information relating to user interactions for numerous users. The historical data store 119 contains user interaction data from previously processed log files. The user interaction data contained within the historical data store 119 can be stateful, in that the user interaction data can be grouped by user identifier and ordered chronologically. FIG. 3 is a block diagram that illustrates user interaction data being updated during a user interaction log data integration process 200 in accordance with an illustrative embodiment. FIG. 3 illustrates four example user identifiers, although the historical data store 119 and log files 116 can contain data associated with thousands or millions of different user identifiers. In one embodiment, previously stored user interaction data 310 are stored in the historical data store 119. As illustrated, no user interaction data associated with user identifier 3 has been previously stored in the historical data store 119.

The new log can contain user interaction data for one or more user identifiers. The user interaction data can be grouped by user identifiers and then sorted chronologically (230). Column 320 illustrates grouped and sorted user interaction data. As illustrated, user identifier 2 does not include any new user interaction data, and user identifiers 1, 3, and 4 have updated user interaction data. For instance, the new log file includes user interaction data associated with user interactions $a_{13}$ and $a_{14}$ that are associated with user identifier 1. The grouped and sorted user interaction data can then merged with the user interaction data stored in the historical data store 119 (240). If a user identifier previously existed in the historical data store 119, the new user interaction data are added to the previous user interaction data. Otherwise, the new user interaction data is added with a new user identifier.

Column 330 illustrates the updated user interaction data for each of the user identifiers. Based upon the updated user interaction data, any conversions that occurred in each of the updated paths of user interactions can be determined (250). User interaction paths are constrained to those user interactions that are related to a particular advertiser 108. The conversion interactions of the particular advertiser 108 are used to determine if a conversion has occurred. As an example, assume that user interactions $a_{13}$ and $a_{32}$ represent conversion interactions. Accordingly, conversion paths 340 and 350 are found. Once found, the conversion paths can be written to another portion of the historical data store 119 or another data store for further analysis.

Each user interaction includes a set of data or dimensions associated with the user interaction. The dimensions can be sparsely populated, such that, any user interaction may have data relating to a subset of the dimensions. A large number of conversion paths can be generated based upon received user interaction data. Various reports regarding how a campaign or an advertiser's placements are performing can include various information regarding the conversion paths. Given the large potential number of conversion paths, various conversion paths can be grouped together to reduce the number of distinct conversion paths that are reported. In an illustrative embodiment, conversion paths that have the same number of user interactions and have corresponding data can be aggregated.

In one embodiment, users are able to create various groups to classify individual user interactions. A group includes a group definition that includes one or more group rules that determine if a particular user interaction belongs to a particular group. The group rules use the dimensional data of the user interaction to determine the group of a user interaction. Boolean operators such as AND, NOT, OR, etc. can be used to join various group rules in a group definition. Each group also includes a group name. In some embodiments, a group can include display information, such as, but not limited to, a text color and/or background color used to display the group name. Default groups may also be available to users. When default groups are available, a user can copy a default group, including the associated group rules, and then modify one or more of the group rules and/or the group name. User created groups can be stored in a data store, such as a local or remote database. The groups can then be accessed, modified, or deleted at a later time.

One or more groups can be associated with one another in a sorted or ordered list of grouping definitions. The groups within the ordered list are used to determine the group for each user interaction. The ordering of the list determines the priority of a particular group. A user interaction is grouped with the matching group that has the highest priority. A matching group of a lower priority will be ignored.

Using the ordered list of grouping definitions, each conversion path can be converted into a group path. A group path contains group elements that correspond to the user interactions of a conversion path. The group element can contain or reference data from the corresponding user interaction. In addition, the group element contains or references the group name and display information of the matching group.

In one embodiment, conversion paths are converted into group paths by adding a reference to the matching group to each of the user interactions. In another embodiment, group paths that are separate from the conversion paths are created. In this embodiment, the group paths can be stored in the same or in a different location from the location where the conversion paths are stored. Regardless of how the group paths are implemented, the group paths can be aggregated based upon the length of the group path and the group name of the group elements that make up the group path.

In one embodiment, the group paths contain various data from the corresponding conversion path. For example, a conversion path can include a monetary value associated with the conversion. As the group paths are aggregated, the value of all conversion paths associated with the aggregated group paths can also be aggregated. This aggregated value can be included in a report.

Figure 4:
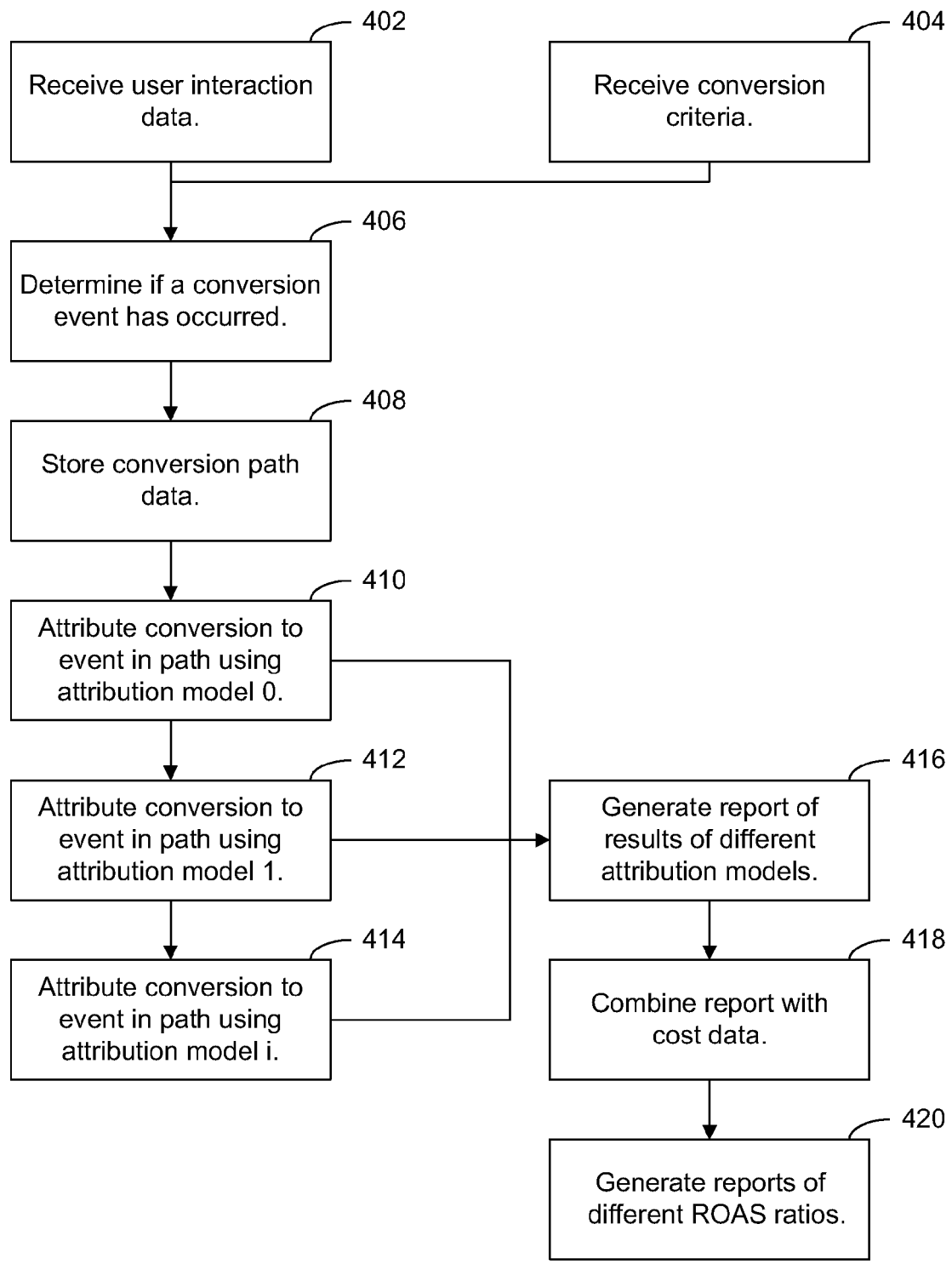
FIG. 4 is a flow chart illustrating a method of using multiple attribution models to report return on advertising spend, according to an exemplary embodiment.

Referring now to FIG. 4, a flow chart illustrating a method of using multiple attribution models to report return on advertising spend will be described. The algorithm which implements the steps of FIG. 4 may be operable on one or more of the advertisement management system 110 (FIG. 1), performance analysis apparatus 120, or other components shown in FIG. 1 At block 402, the system is configured to receive user interaction data. At block 404, conversion criteria are stored and access to the conversion criteria is provided to the system. At block 406, the system is configured to determine whether a conversion event has occurred based on the user interaction data and the conversion criteria. Regardless of whether a conversion event has occurred, partial or complete conversion path data is stored at block 408.

At block 410, the system is configured to provide attribution of one or more conversion events detected in block 406. Attribution may be provided to one or more channels in a conversion path, and in varying amounts, based on a first attribution model or algorithm identified as attribution model 0. The system may provide the attribution by calculating an amount of credit, for example denominated in generic units (e.g., a percentage of the 1 conversion event), in currency, or in other units. The system may store the attribution data associated with each channel in a memory.

At blocks 412 and 414, the system may be configured to provide attribution of one or more of the same conversion events processed in block 410, though in this case using one or more additional different attribution models. Some exemplary attribution models will be described below, but may include such models as first click, first touch, channel touch, recency, or combinations thereof. Additional sets of attribution data may be generated at blocks 412 and 414 and stored in memory. In one exemplary embodiment, blocks 412 and/or 414 may use attribution models other than a model based solely on the last click in the conversion path.

In one example, the conversion criteria themselves may be part of an attribution model, for example, if the attribution model includes a lookback window. Therefore, multiple conversion criteria may be applied as needed by different attribution models in the process. In one embodiment, selection of conversion events (block 406) should be the broadest match selection, e.g., rules to define what counts as conversion for all attribution models to be used.

At block 416, the system may be configured to report the results of the different attribution models in textual, graphical, or other formats, some examples of which will be described below.

At block 418, the system may be configured to receive cost data representing a relative or actual cost of a plurality of different channels in a conversion path for a particular advertiser. The system may be configured to combine the attribution data sets with the cost data in any of a number of ways, for example by calculating ratios, percentages, etc. At block 420, the system is configured to generate report data based on a plurality of sets of attribution data and the cost data (e.g., return on ad spend or ROAS). The report data generated may be transmitted to a client device for display. The advertiser can then use the report data to make more informed decisions about the cost effectiveness of using certain advertising channels.

Figure 5:
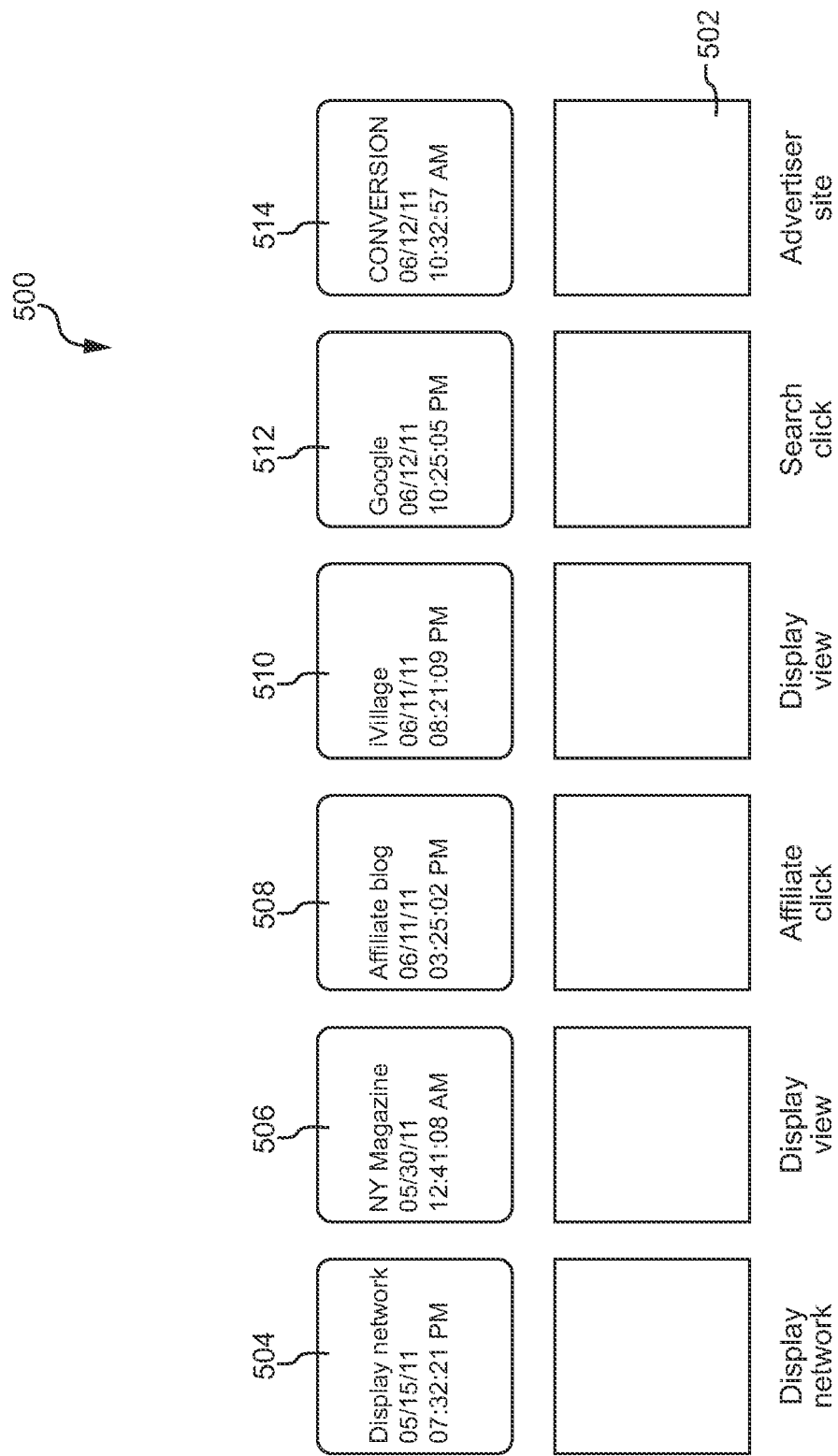
FIG. 5 is an illustration of conversion path data, according to an exemplary embodiment.

Referring now to FIG. 5, an illustration of conversion path data will be described, according to an exemplary embodiment. The illustration 500 (and similar illustrations in the other figures) may or may not represent graphical elements that would be part of report data transmitted to a client device. In this example, using the methods described above, the systems has stored a conversion path comprising six user interactions that led to a conversion event of, in this case, arriving at an advertiser site 502 and making a purchase at the web site (either of which could be a conversion event in various embodiments). Each event or user interaction in the conversion path comprises channel identifier data, which may identify the specific channel and/or channel type.

For example, channel 504 is a display network channel. A display network channel may be a channel associated with a network of web sites all signed up with or registered with a particular advertisement publishing network. The publishing network may be an entity which buys specific placements on many web sites and matches many different advertisements from different advertisers to the placements. In the case of channel 504, an impression of an advertisement for advertiser site 502 or a product thereon was shown on May 15, 2011 at 7:32:21 PM.

A couple weeks later, on May 30, 2011 at 12:41:08 AM, the same user was provided with an impression for advertiser site 502 through a second channel, different than the first channel, namely a content-oriented web site identified as NY Magazine. This impression is recorded when the user visits the web site and stored for later use.

A while later, on Jun. 11, 2011 at 3:25:02 PM, the user visits an affiliate blog channel 508 and interacts with the channel by clicking on the link associated with advertiser site 502. An affiliate channel may be a price comparison-type web site or other click tracker web site which gets credit or compensation for a user clicking on information on the web site. About 5 hours later, the user interacts with yet another different channel, a web page 510 showing an advertisement in an advertisement slot on the web page.

The next day, the user performs a search using a search engine channel 512. About six minutes later, a conversion event is finally detected at conversion event 514. The user has reached the advertiser web site.

The advertisements viewed or otherwise interacted with in this example may be from one advertisement campaign or from multiple campaigns running at once, all associated with the advertiser and/or at least one same conversion goal.

A conversion event has happened, and the system is configured to attribute credit for the conversion event to one or more channels or events in the conversion path.

Figure 6:
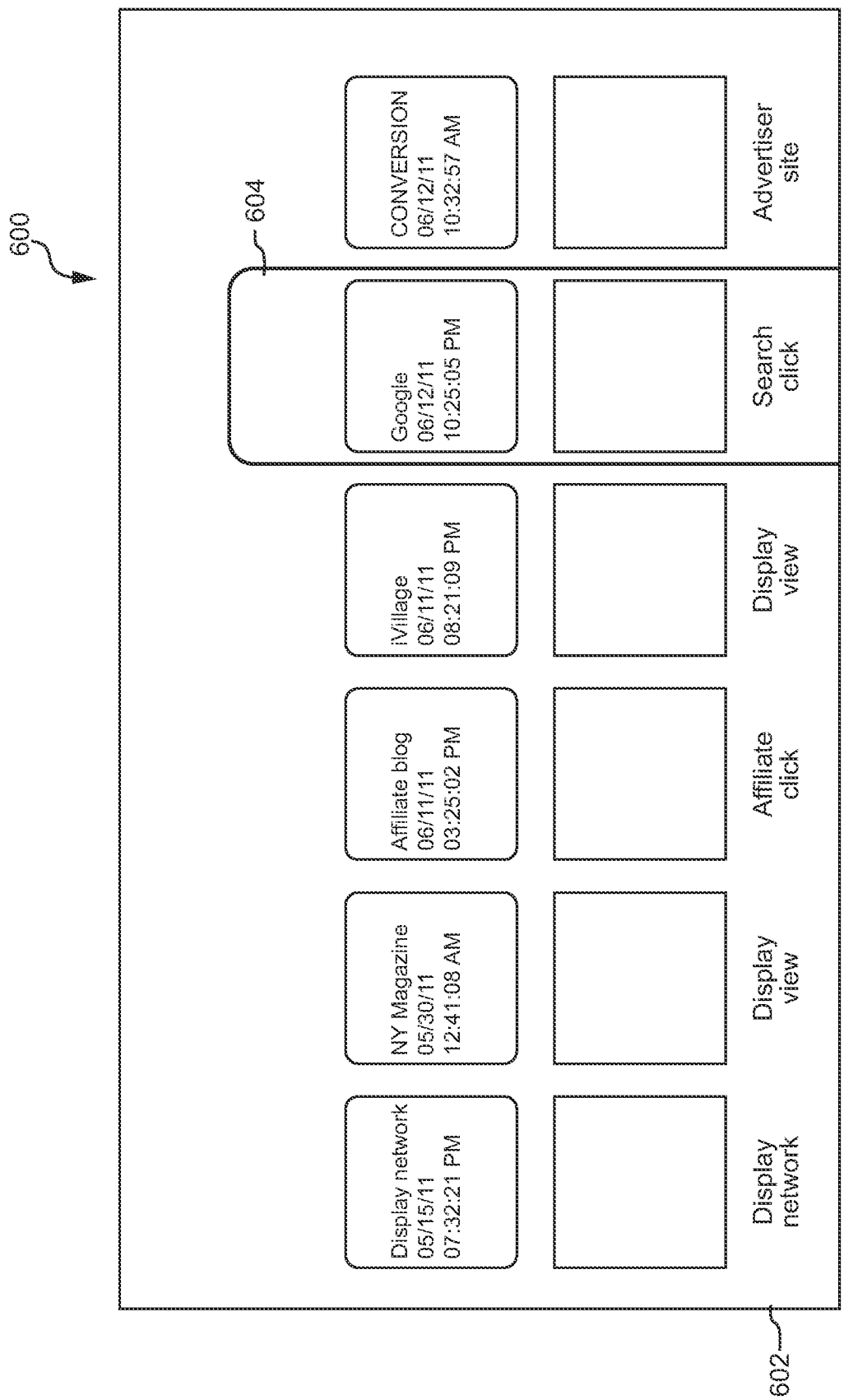
FIG. 6 is an illustration of a last click attribution model, according to an exemplary embodiment.

Referring to FIG. 6, an illustration of a last click attribution model is shown. Illustration 600 appears similar to illustration 500, except that a graph 602 has been overlaid on the conversion channel illustrations to generally represent an amount of attribution credit to be allocated to each channel. In the last click model, the system is configured to give all or substantially all of the credit (represented by bar 604) for the conversion to the last click in the conversion path before the conversion event, within a given time window. If no click is present in the time window, it assigns a credit to the closest display impression that is within the impression window.

Figure 7:
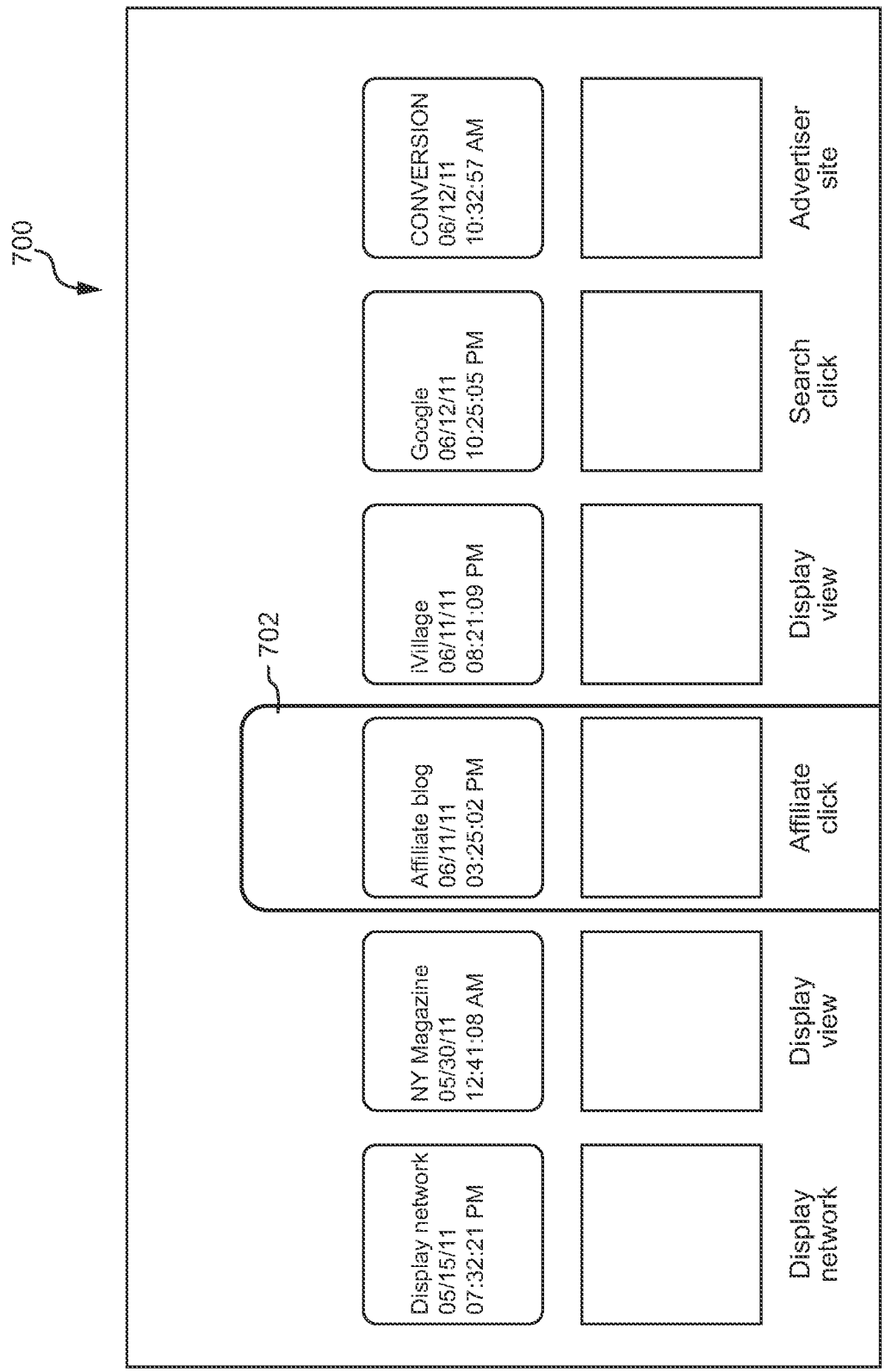
FIG. 7 is an illustration of a first click attribution model, according to an exemplary embodiment.

Referring to FIG. 7, an illustration of a first click attribution model is shown. Illustration 700 shows the effect of running the first click attribution model on the conversion path data. In this case, the first click in the conversion path is attributed all or substantially all of the credit, as shown by bar 702. The first click model is effected in part by the lookback window selected by the advertiser. Credit is given to the furthest active (click) type exposure to the conversion that is within a given window. If no click is present in the time window, it assigns a credit to the furthest away display impression that is within the impression window.

Figure 8:
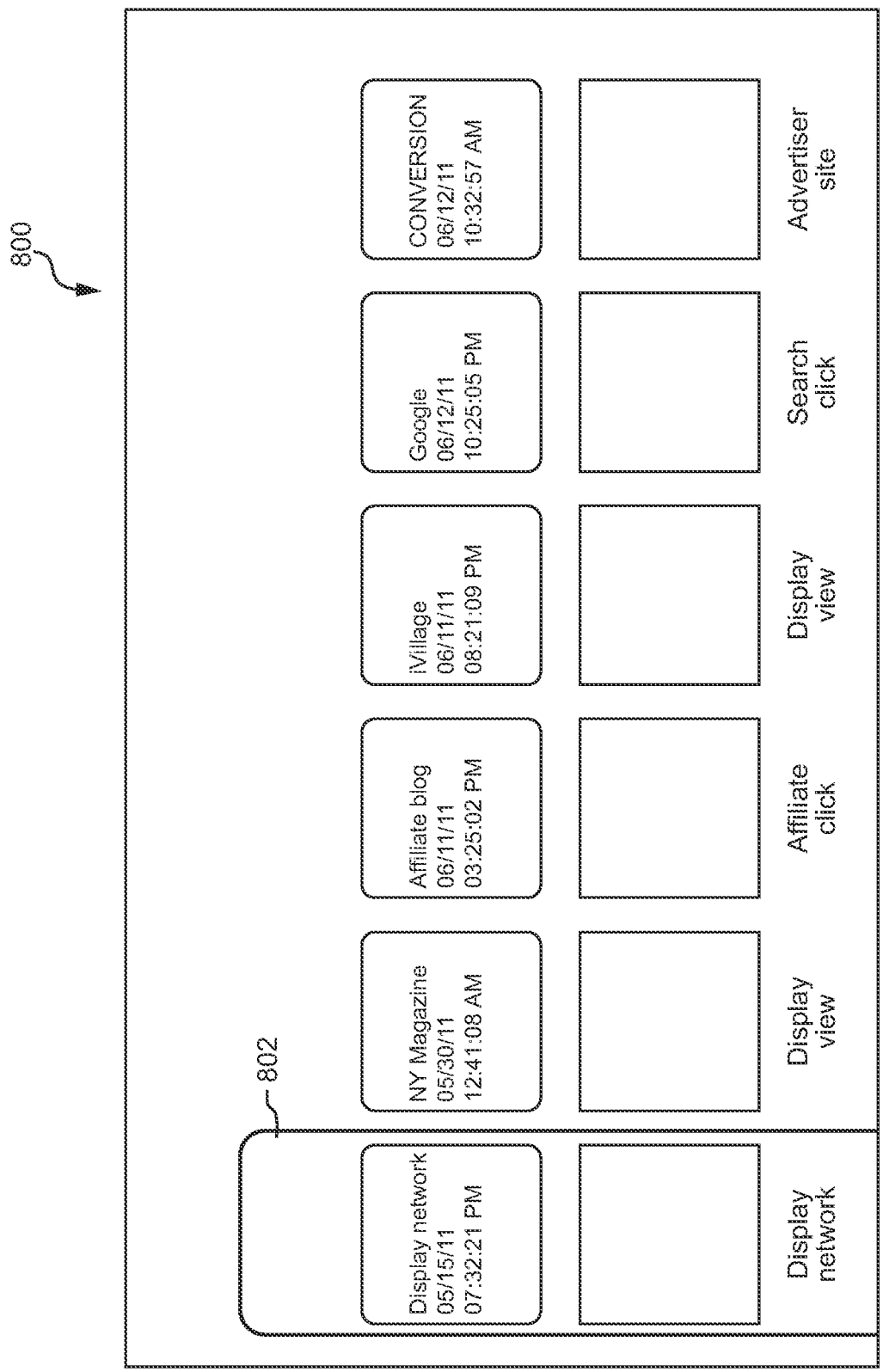
FIG. 8 is an illustration of a first touch attribution model, according to an exemplary embodiment.

Referring to FIG. 8, an illustration of a first touch attribution model is shown. First touch rewards all or substantially all of the credit to the first event in the conversion path, regardless of whether it is a click, impression, or other event. In this case, the display network channel is awarded all of the credit for the conversion, as indicated by bar 802. Credit is assigned to the furthest exposure away from the conversion that is within the lookback window. In another example, a first touch attribution model may be adjusted to determine the earliest point in time prior to conversion that a marketing channel would be credited by this model, using a lookback window specific to this model.

Figure 9:
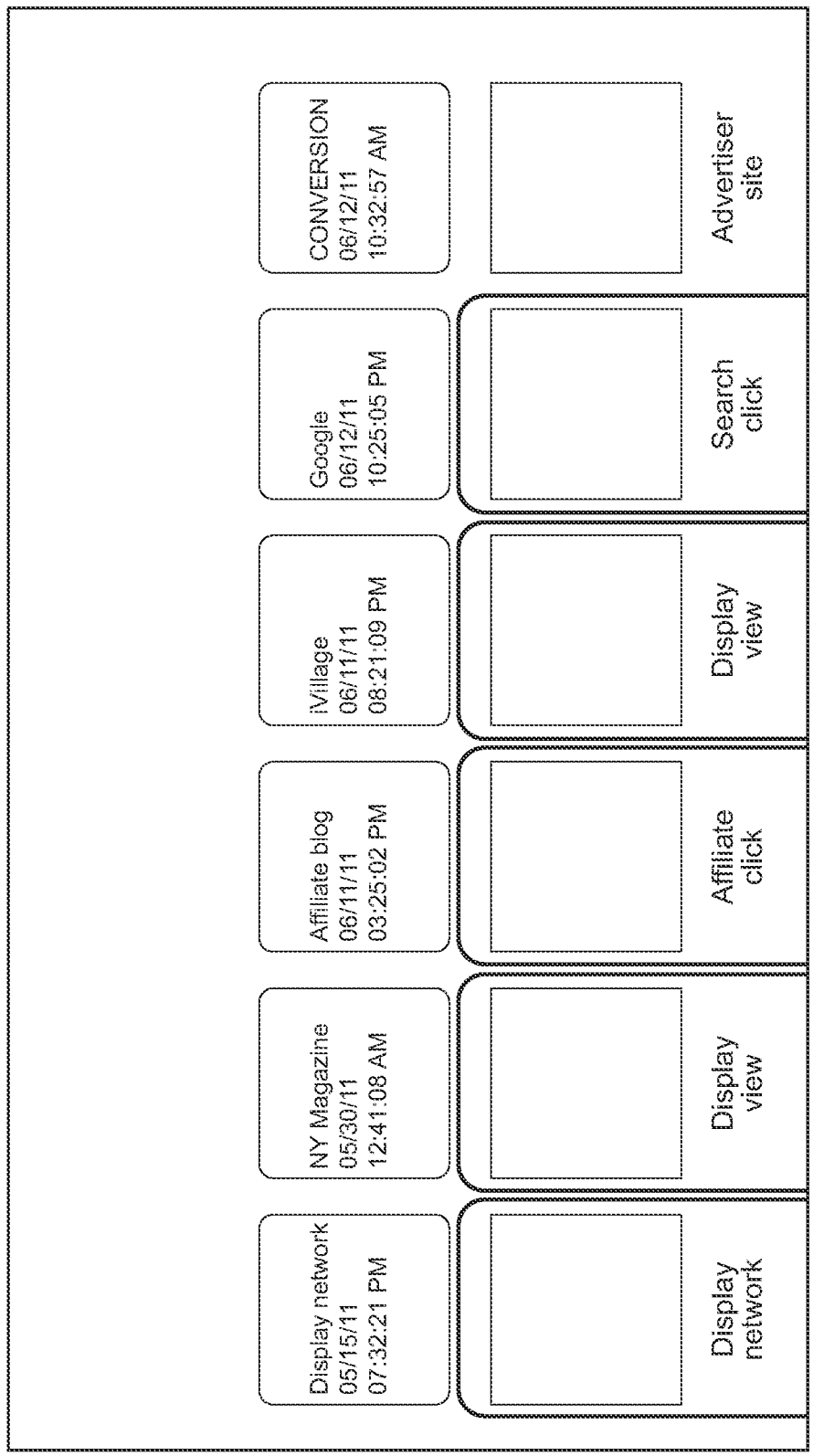
FIG. 9 is an illustration of a channel touch attribution model, according to an exemplary embodiment.

Referring to FIG. 9, an illustration of a channel touch attribution model is shown. The channel touch model or reach model credits shares credit among multiple channels. In this case, all channels are given an equal portion of the credit for the conversion, in this case one-fifth of the credit to each of five channels. A variation on this model is to credit campaigns equally. For example, if campaign A represents two channels in the conversion path and campaign B represents one channel in the conversion path, each of the campaign A and campaign B will receive an equal portion of the credit. A channel may be defined for purposes of this model as a campaign or medium.

Figure 10:
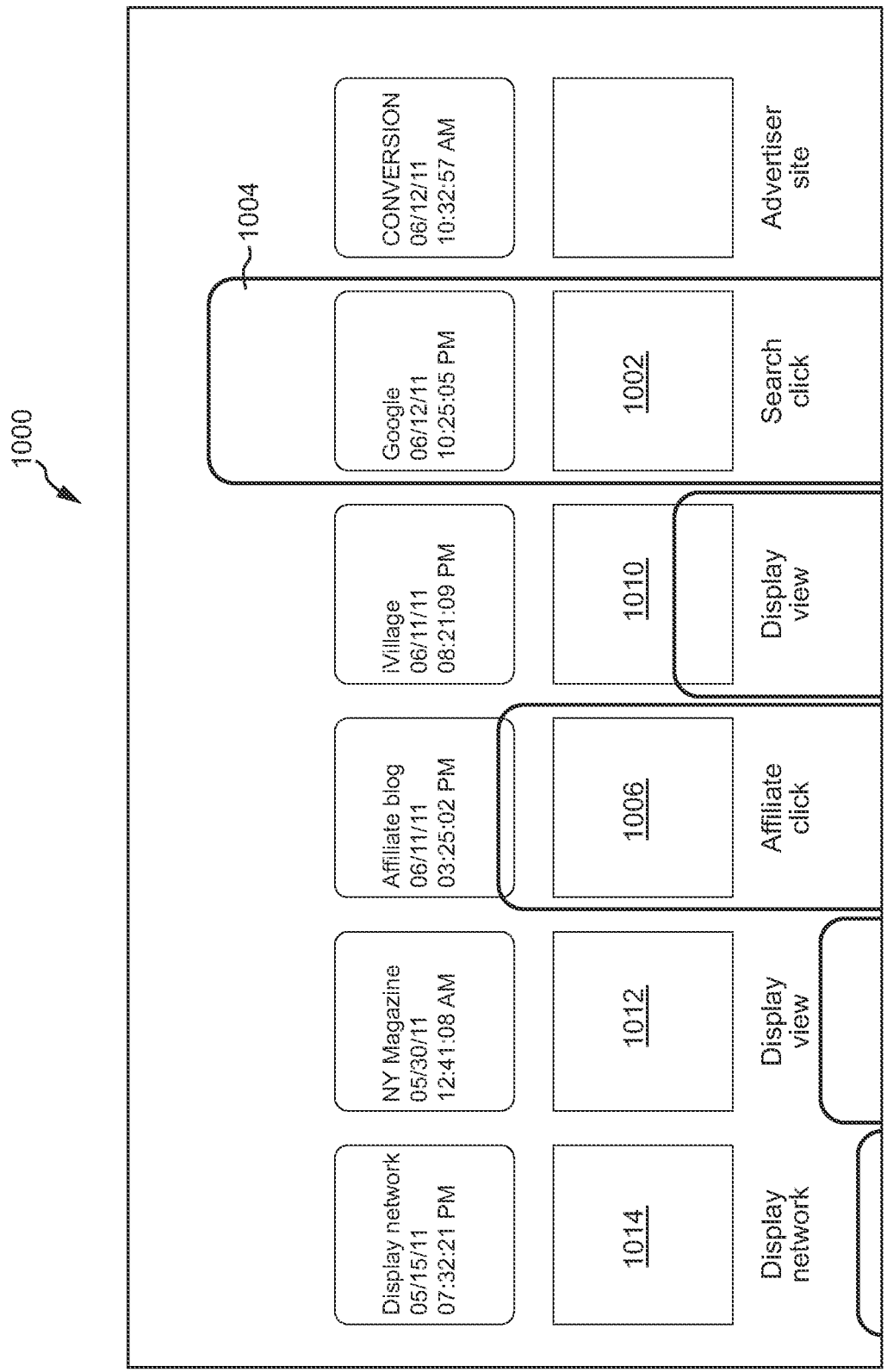
FIG. 10 is an illustration of a recency attribution model, according to an exemplary embodiment.

Referring to FIG. 10, an illustration of a recency attribution model is shown. The recency model rewards proximity to conversion on an ascending scale of credit. This model may further award more weighting of credit for clicks than for displays. Referring to illustration 1000, the search click channel 1002 receives the largest portion of credit (as indicated by bar 1004). The second largest portion of credit is allocated to the affiliate click channel 1006 (as indicated by bar 1008). Although channel 1006 is further from the conversion than the display view channel 1010, channel 1006 is awarded a higher portion of the credit due to the click. Channels 1012 and 1014 are awarded the lowest amount of credit because they are furthest from the conversion and are not associated with any clicks.

The algorithms for calculating these attribution models may comprise parameters which can be adjusted, for example by the advertisers. For example, the recency weighting may be linear or exponential. The difference in weighting between clicks and views may have a multiplier which is adjustable.

In one particular example, in the recency model, credit may be assigned using a continuous exponential decay function that reflects the non-linear way that people remember or are influenced by exposure to information. This function may have two parameters: the decay half life of the function and an 'active' event type multiplier by which raw scores are multiplied. The function may also apply a logical test that discards conversions that have low total scores. An exemplary algorithm for such a model is provided below:

```
memoryDecay( report, conversionWindow, activeMultiplier, decayFactor )
{
    for( Conversion c : report )
    {
        conCur = { };
        /* scoring phase stores in conCur */
        for( Exposure e : c.exposures( ) )
        {
            if( withinWindow( e, conversionWindow ) )
            {
                if( isClick( e ) )
                {
                    conCur.put( e => activeMultiplier )
                }
                else
                {
                    conCur.put( e => 1.0 );
                }
            }
            else
            {
                conCur.put( e =>
                    exp( – ( interval( c, e ) – conversionWindow ) /
                        decayFactor ) );
                if( isClick( e ) )
                {
                    conCur.put( e=> conCur.get( e ) *
                        activeMultiplier );
                }
            }
        }
        /* Logical test */
        total = 0;
        for( e => score : conCur )
        {
            total = total + score;
        }
        score = 1 – ( 1 / ( 1 + total ) );
        /* if low score then discard */
        if( score < 0.5 )
        {
            for( e => score : conCur )
            {
                conCur.put( e => 0.0 );
            }
        }
        /* Record the scores for the exposure */
        for( e => score : conCur )
        {
            recordScore( e, score );
        }
    }
}
```

In one embodiment, the active multiplier may be calculated using a function which calculates the proportion of active conversions as a proportion of conversions.

$$100/(1-((clickP+clickP)/(clickP+impressionP)))$$

The value of clickP is the count of presence of conversions including clicks. The value of impressionP is the count of conversions including impressions. This function is predominantly driven by the presence of display-only conversion paths. The numerator includes two clickPs to balance the formula for the case that there are only click paths where all terms will be equal. The formula is biased toward clicks. For conversions which only include a click, a count of one may be added to impressions because there would be an impression if there was a click.

The equation shown above may provide an up weighting for clicks over impressions, where the impression weight is 100. For example, if this parameter is 200, then a click is valued at 2× an impression.

The decay factor used may be based on how fast customers convert. The decay factor may be calculated based on a time lag from first touch to conversion for all conversions. Then all of the conversions may be sorted by lag from first touch to conversion, to provide cumulative time to conversion. The time conversions may be listed and analyzed to reach the $50^{th}$ percentile of the conversion base. This $50^{th}$ percentile represents the time required for at least half of the fastest converters to achieve a conversion. A predetermined threshold of time (e.g., 2 hours) can be used so that when the time for the $50^{th}$ percentile is less than 2 hours, 2 hours is used. This time is used as a "half-life" to conversion for the time decay factor by calculating. The half life determines at what time interval the function allocates 0.5 raw un-weighted credits, as shown in the following equation:

$$(-halfLife/log(0.5))$$

This gives a decay factor that results in 0.5 credit being assigned after 1 half life. Ultimately as this is driven by the conversions in the report it is essentially fit to the type of campaigns/media mix being used.

One justification for the recency attribution model is that as time passes, the influence of exposure to or interaction with marketing channels may decline due to memory effects, and the decay factor accounts for this. For this reason a recency model can be referred to as a 'memory' model and the curve as a 'memory' or 'forgetting' curve Time to conversion may be calculated in whole hours for a cumulative time to conversion. For example:

Time to Conversion Cumulative Percentage of Converters

| | |
|---|---|
| 0 | 20% |
| 1 | 35% |
| 2 | 45% |
| 3 | 50% |
| 4 | 55% |

In this example, in less than one hour, 20% of users convert. Within 3 hours 50% of the users have converted. In this case, 3 hours is used as the half life.

For any of the models or functions described above, the system is configured to score or credit the channels as shown. Next, output data is grouped or accumulated. For example, all exposures or channels and their respective scores are examined and summed against a given group, determined by the channel. For example, credit given to campaigns may be calculated by a function and then iterated over all recorded scores and then each exposure score added to the running total for the campaign to which the exposure belongs. This score accumulation process can be repeated for any dimension associated with the exposure including site name, advertiser, creative, placement, etc.

A final accumulation stage may involve calculating the percentage of credit for each grouping. This calculation may comprise summing the total credit for a given function, then dividing through all of the groups.

Another accumulation action may comprise factoring through revenue. The system may be configured to reweigh all function score totals per conversion to 1 and factor through the conversion value. The result of this re-weighting is to change the distance of values for the domains of each conversion. The system may be configured to use a percentage view of results to yield the most consistent result. The system may then compare to spend percentage by the given dimension group.

Multiple attribution algorithms may be applied to the same user interactions (e.g., ad exposures, active clicks, conversion data, etc.) and the results compared.

Figure 11:
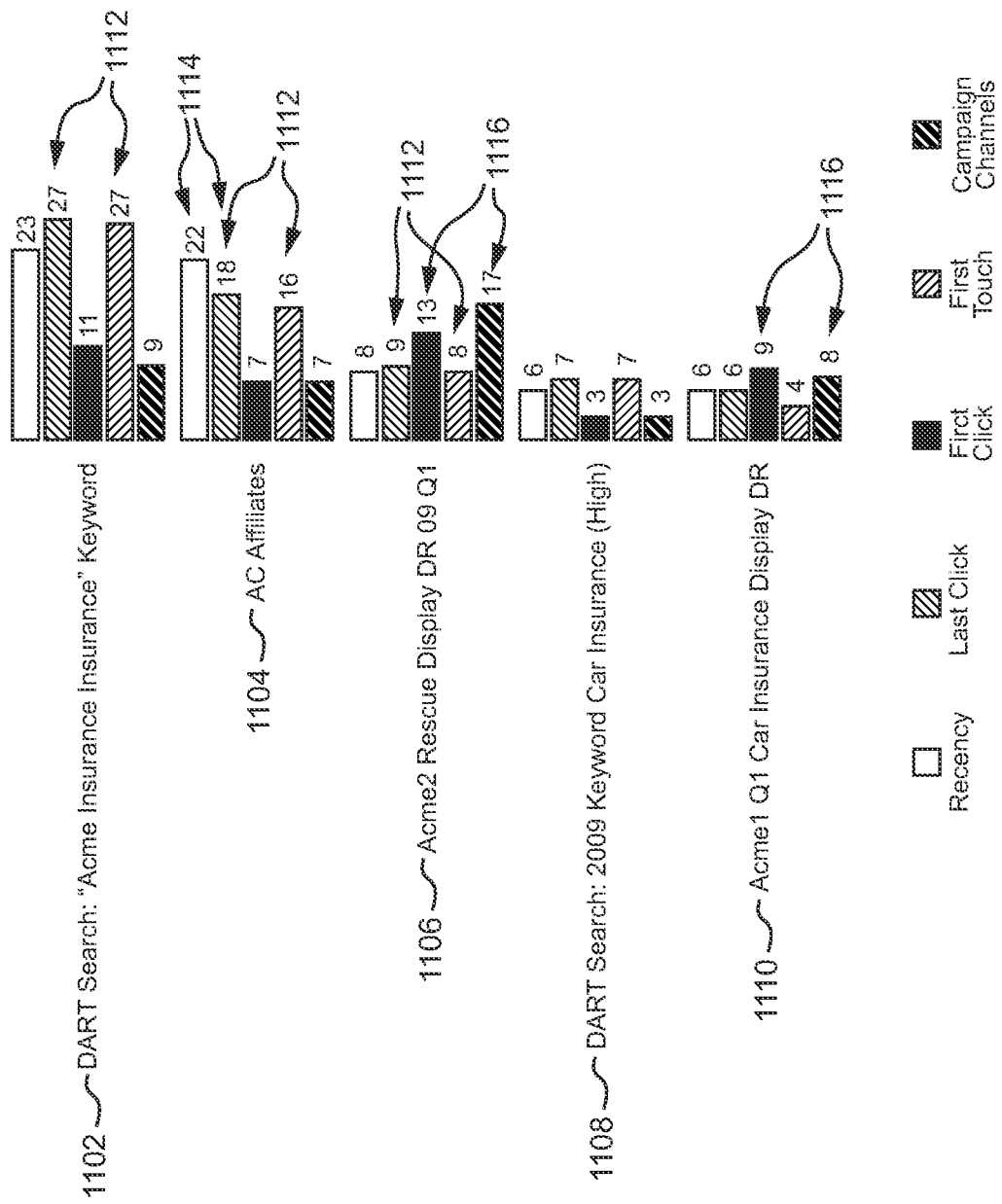
FIG. 11 is an illustration of exemplary display data or report data showing results of multiple attribution model calculations, according to an exemplary embodiment.

Referring now to FIG. 11, an illustration of exemplary display data or report data showing results of multiple attribution model calculations will be described. In this example, credit has been attributed to multiple channels in a plurality of conversion paths for a marketing campaign for "Acme Insurance." A first channel 1102 represents a search engine search for "Acme Insurance Insurance" keywords. A second channel 1104 represents an affiliate channel. A third channel 1106 represents an online display campaign for Acme Insurance product A. A fourth channel 1108 represents a search engine search for "Car Insurance" keywords. A fifth channel 1110 represents an online display campaign for Acme Insurance product B.

The first (top) bar in each set of bars in the bar graph represents an amount of credit attributed to the channel by the system using a recency attribution model. The second bar in each set of bars represents the amount of credit attributed using a last click attribution model. The third bar represents a campaign channel distribution model. The fourth bar represents a first click attribution model, and the third bar represents a first touch attribution model. Each bar may be based on attribution data generated by the system.

The advertiser may make certain observations about the data. For example, First Click gives about the same credit as Last Click for each of the channels, as shown by arrows 1112. Second, the recency model rewards affiliates slightly more than the last click model, as shown by arrows 1114. Third, display has the greatest presence in the first touch and channel models, as shown by arrows 1116. The report data or display data may be grouped by site grouping, campaign grouping, creative level grouping, placement level grouping, or other groupings. The groupings should add up to 100% of the credit. As shown at 1118, the grouping of this data is by campaign. Alternatively, the grouping may be site, sit placement, etc. Use of the terms channel or marketing channel herein may refer to channels on any of these levels.

Referring now to FIG. 12, an illustration of exemplary display data or report data showing results of multiple attribution model calculations comprising cost data will be described. The system may be configured to generate cost data in any of a number of ways. The cost data may be part of a return-on-investment or return on advertising spend analysis. The system may be configured to receive costs data representing a relative or actual cost of a plurality of channels in a conversion path. The analysis may be configured to compare the relative or actual cost to the credit given to each channel. The cost data may comprise the media spend data for each channel analyzed.

Referring to channel 1 in this example, the received cost data may be presented in a bar graph form at bar 1202, indicated as 15% of the cost of the marketing campaign. The attribution data indicates at bar 1204 that, using attribution model B, channel 1 receives 25% of the credit. The attribution data further indicates at bar 1206 that, using attribution model A, channel 1 receives 20% of the credit. A conclusion may be drawn by an advertiser or the system that because credit percentage exceeds the media cost percentage using both attribution model algorithms, this channel appears to be a relatively cost effective channel.

Turning to channel 2, media cost is 35%, model B allocates 30% of the credit and model A allocates 25% of the credit. A conclusion may be drawn by an advertiser or the system that because credit percentage is below the media cost percentage for both models, this appears to be a relatively expensive channel.

Turning to channel 3, media cost is 25%, model B allocates 20% of the credit for conversions to channel 3 and model A allocates 30% of the credit to channel 3. In this case, the credit percentage relationship to cost varies by model. The decision of whether the channel is cost effective or expensive, and how to allocate future cost decisions depends on the advertiser or system's view on how the exposure path drives value.

As shown, the system may be configured to generate return on ad spend data based on credit or attribution data and cost data. The system may be configured to divide credit by the cost and present the data to a user in any of a variety of formats, such as textual, ratio, graphical, such as bar graph, or other formats. The system may further be configured to highlight or flag some data using different colors, highlighting, underlining, bolding, sounds, etc. For example, a credit to cost ratio of greater than 1 may be identified in the report data as efficient (e.g., with a green color), while a credit to cost ratio of less than 1 may be identified in the report data as inefficient (e.g., with a red color).

The system may be configured to perform a return on investment or return on advertising spend by receiving marketing spend and attributing credit of multiple models and calculating ratios of model credit to spend. The system may be configured to allocate the data over multiple sites, multiple campaigns, multiple creatives, etc.

Referring now to FIG. 12B, an illustration of exemplary display data or report data showing results of multiple attribution model calculations comprising cost data will be described. The data used in this illustration is the same as the data from FIG. 12. In FIG. 13, the cost data is presented in textual format comprising percentages and ratios, along with colored highlighting. In the case of channel 1, a ratio of 1.33 "model A" credit/cost is presented in green text and a ratio of 1.67 "model B" credit/cost is presented in green text, because both models indicate an effective spend. In the case of channel 2, both ratios are presented in red text. In the case of channel 3, model A credit/cost ratio of 1.20 is presented in green text model B credit/cost ratio is presented in red text. Other colors or highlighting options are contemplated. The ratios may be presented in a matrix or table for ease of visualization.

FIG. 13 illustrates a depiction of a computer system 1300 that can be used to provide user interaction reports, process log files, implement an illustrative performance analysis apparatus 130, or implement an illustrative advertisement management system 110. The computing system 1300 includes a bus 1305 or other communication component for communicating information and a processor 1310 coupled to the bus 1305 for processing information. The computing system 1300 also includes main memory 1315, such as a random access memory (RAM) or other dynamic storage device, coupled to the bus 1305 for storing information, and instructions to be executed by the processor 1310. Main memory 1315 can also be used for storing position information, temporary variables, or other intermediate information during execution of instructions by the processor 1310. The computing system 1300 may further include a read only memory (ROM) 1310 or other static storage device coupled to the bus 1305 for storing static information and instructions for the processor 1310. A storage device 1325, such as a solid state device, magnetic disk or optical disk, is coupled to the bus 1305 for persistently storing information and instructions.

The computing system 1300 may be coupled via the bus 1305 to a display 1335, such as a liquid crystal display, or active matrix display, for displaying information to a user. An input device 1330, such as a keyboard including alphanumeric and other keys, may be coupled to the bus 1305 for communicating information, and command selections to the processor 1310. In another embodiment, the input device 1330 has a touch screen display 1335. The input device 1330 can include a cursor control, such as a mouse, a trackball, or cursor direction keys, for communicating direction information and command selections to the processor 1310 and for controlling cursor movement on the display 1335.

According to various embodiments, the processes that effectuate illustrative embodiments that are described herein can be implemented by the computing system 1300 in response to the processor 1310 executing an arrangement of instructions contained in main memory 1315. Such instructions can be read into main memory 1315 from another computer-readable medium, such as the storage device 1325. Execution of the arrangement of instructions contained in main memory 1315 causes the computing system 1300 to perform the illustrative processes described herein. One or more processors in a multi-processing arrangement may also be employed to execute the instructions contained in main memory 1315. In alternative embodiments, hard-wired circuitry may be used in place of or in combination with software instructions to implement illustrative embodiments. Thus, embodiments are not limited to any specific combination of hardware circuitry and software.

Although an example processing system has been described in FIG. 13, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus, such as a processing circuit. A processing circuit may comprise any digital and/or analog circuit components configured to perform the functions described herein, such as a microprocessor, microcontroller, application-specific integrated circuit, programmable logic, etc. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer system for providing attribution based on advertisement conversion data, the system comprising:
  a processing circuit configured to:
  receive user interaction data specifying a user interaction with one or more content items and a conversion item that satisfies a conversion criteria;
  determine that a conversion event has occurred based on the user interaction data and the conversion criteria;

store conversion path data based on the user interaction data, wherein the conversion path data comprises a first user interaction, a second user interaction, and the conversion event;

attribute the conversion event, at least in part, to at least one of a first channel of the first user interaction of the conversion path data or a second channel of the second user interaction of the conversion path data using a first attribution model to generate first attribution data;

attribute the conversion event, at least in part, to at least one of the first channel of the first user interaction of the conversion path data or the second channel of the second user interaction of the conversion path data using a second attribution model different than the first attribution model to generate second attribution data, wherein at least one of the first and second attribution models is a model other than a model based solely on a last click in the conversion path;

receive cost data representative of a relative or actual cost of the first channel and the second channel; and generate display data comprising first visual indicia representative of a first return on cost for the first channel based on the first attribution data and the cost data, second visual indicia representative of a second return on cost for the first channel based on the second attribution data and the cost data, third visual indicia representative of a third return on cost for the second channel based on the first attribution data and the cost data, and fourth visual indicia representative of a fourth return on cost for the second channel based on the second attribution data and the cost data.

2. The computer system of claim 1, wherein the second attribution model allocates credit to both the first channel and the second channel.

3. The computer system of claim 1, wherein the second attribution model allocates more credit for a click than for an impression.

4. The computer system of claim 1, wherein the second attribution model allocates more credit to the first channel than the second channel, wherein the first user interaction is closer in time to the conversion event than the second user interaction.

5. The computer system of claim 1, wherein the first return on cost, the second return on cost, the third return on cost, and the fourth return on cost are in the form of ratios of credit to cost.

6. The computer system of claim 5, wherein the report data comprises display data having a different appearance for ratios exceeding one than for ratios less than one.

7. The computer system of claim 1, wherein the processing circuit is further configured to attribute the conversion event at least in part, to at least one of the first channel or the second channel of the conversion path data using a third attribution model different than the first and second attribution models.

8. The computer system of claim 1, wherein the first channel and the second channel of the conversion path data are selected from the group consisting of an affiliate web page, a paid search web page, or an advertisement display view.

9. A method for providing return on advertisement spend data based on advertisement conversion data, the method comprising:

receiving, at a data processing circuit, user interaction data specifying a user interaction with one or more content items and a conversion item that satisfies a conversion criteria, the conversion item of the user interaction data received from a user device responsive to a selection of a content item of the one or more content items;

determining, using the data pr that a conversion event has occurred based on the user interaction data and the conversion criteria;

storing, in a data storage device, conversion path data based on the user interaction data comprising a first user interaction, a second user interaction, and the conversion event;

attributing, using the data processing circuit, the conversion event at least in part to at least one of a first channel of the first user interaction of the conversion path data or a second channel of the second user interaction of the conversion path data using a first attribution model to generate first attribution data;

attributing, using the data processing circuit, the conversion event at least in part to at least one of the first channel of the first user interaction of the conversion path data or the second channel of the second user interaction of the conversion path data using a second attribution model different than the first attribution model to generate second attribution data;

receiving, at the data processing circuit, cost data representative of a relative or actual cost of the first channel and the second channel; and generating, using the data processing circuit, display data comprising first visual indicia representative of a first return on cost for the first channel based on the first attribution data and the cost data, second visual indicia representative of a second return on cost for the first channel based on the second attribution data and the cost data, third visual indicia representative of a third return on cost for the second channel based on the first attribution data and the cost data, and fourth visual indicia representative of a fourth return on cost for the second channel based on the second attribution data and the cost data.

10. The method of claim 9, further comprising grouping, using the data processing circuit, data from a plurality of conversions for an advertising campaign.

11. The method of claim 9, wherein at least one of the first and second attribution models more heavily weighs a click than an impression and wherein at least one of the first and second attribution models weighs more heavily the first user interaction than the second user interaction, wherein the first user interaction is closer in time to the conversion event than the second user interaction.

12. The method of claim 9, wherein the display data further comprises bar graph data illustrating attribution credit for the first channel and the second channel according to the first and second attribution models and cost data for each of the first channel and the second channel.

13. The method of claim 9, wherein the display data further comprises textual ratio data representative of ratios of credit to cost for a plurality of channels using a plurality of different attribution models.

14. The method of claim 9, wherein the first channel represents a search click and the second channel represents an affiliate click.

15. A non-transitory computer-readable medium comprising program instructions which, when executed by a processing circuit, perform functions comprising:

receiving user interaction data specifying a user interaction with one or more content items and a conversion item that satisfies a conversion criteria;

determining that a conversion event has occurred based on the user interaction data and the conversion criteria;

storing conversion path data based on the user interaction data, wherein the conversion path data comprises a first user interaction, a second user interaction, and the conversion event;

attributing the conversion event, at least in part, to at least one of a first channel of the first user interaction of the conversion path data or a second channel of the second user interaction of the conversion path data using a first attribution model to generate first attribution data;

attributing the conversion event, at least in part, to at least one of the first channel of the first user interaction of the conversion path data or the second channel of the second user interaction of the conversion path data using a second attribution model different than the first attribution model to generate second attribution data, wherein at least one of the first and second attribution models is a model other than a model based solely on a last click in the conversion path;

receiving cost data representative of a relative or actual cost of the first channel and the second channel; and generating display data comprising first visual indicia representative of a first return on cost for the first channel based on the first attribution data and the cost data, second visual indicia representative of a second return on cost for the first channel based on the second attribution data and the cost data, third visual indicia representative of a third return on cost for the second channel based on the first attribution data and the cost data, and fourth visual indicia representative of a fourth return on cost for the second channel based on the second attribution data and the cost data.

16. The non-transitory computer-readable medium of claim 15, wherein the second attribution model allocates credit to both the first channel and the second channel.

17. The non-transitory computer-readable medium of claim 15, wherein the second attribution model allocates more credit for a click than for an impression.

18. The non-transitory computer-readable medium of claim 15, wherein the second attribution model allocates more credit to the first channel than the second channel, wherein the first user interaction is closer in time to the conversion event than the second user interaction.

19. The non-transitory computer-readable medium of claim 15, wherein the first return on cost, the second return on cost, the third return on cost, and the fourth return on cost are in the form of ratios of credit to cost.

20. The non-transitory computer-readable medium of claim 19, wherein the report data comprises display data having a different appearance for ratios exceeding one than for ratios less than one.

* * * * *